US011134359B2

(12) United States Patent
Liang et al.

(10) Patent No.: US 11,134,359 B2
(45) Date of Patent: *Sep. 28, 2021

(54) SYSTEMS AND METHODS FOR CALIBRATED LOCATION PREDICTION

(71) Applicant: xAd, Inc., New York, NY (US)

(72) Inventors: Can Liang, Sunnyvale, CA (US); Yilin Chen, Sunnyvale, CA (US); Jingqi Huang, Santa Clara, CA (US); Shun Jiang, Sunnyvale, CA (US); Amit Goswami, Campbell, CA (US)

(73) Assignee: xAd, Inc., New York, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/726,056

(22) Filed: Dec. 23, 2019

(65) Prior Publication Data

US 2020/0213805 A1 Jul. 2, 2020

Related U.S. Application Data

(63) Continuation-in-part of application No. 16/506,940, filed on Jul. 9, 2019, now Pat. No. 10,939,233, which
(Continued)

(51) Int. Cl.
*H04W 4/021* (2018.01)
*H04L 29/08* (2006.01)
(Continued)

(52) U.S. Cl.
CPC ............ *H04W 4/021* (2013.01); *G06F 16/29* (2019.01); *G06N 20/00* (2019.01); *H04L 67/18* (2013.01)

(58) Field of Classification Search
CPC ..... H04W 4/021; H04W 4/029; H04W 4/185; H04W 4/025; H04W 4/06; H04W 4/08;
(Continued)

(56) References Cited

U.S. PATENT DOCUMENTS

| 7,574,661 B2 | 8/2009 | Matsura et al. |
| 8,438,127 B2 | 5/2013 | Kurata et al. |
| (Continued) | | |

FOREIGN PATENT DOCUMENTS

| AU | 2016349513 B2 | 7/2020 |
| CN | 105868845 A | 8/2016 |
| (Continued) | | |

OTHER PUBLICATIONS

Liang, Notice of Allowance, U.S. Appl. No. 15/344,482, dated Apr. 19, 2018, 14 pgs.
(Continued)

*Primary Examiner* — Ninos Donabed
(74) *Attorney, Agent, or Firm* — USCH Law, PC

(57) ABSTRACT

A system includes a machine learning module configured to train a location prediction model using features constructed from mobile device data with time stamps in a training time period, and labels extracted from mobile device data with time stamps in a training time frame. The system further includes a prediction module configured apply the prediction model to a feature set constructed using mobile device data associated with a mobile device with time stamps in a prediction time period to obtain a prediction result corresponding to the mobile device. The system further includes a calibration module configured to obtain a calibration model corresponding to an information campaign, and a calibrated prediction module configured to apply the calibration model to the prediction result to obtain a calibrated probability for the mobile device to have at least one location event at any of one or more locations associated with the information campaign during a prediction time frame.

18 Claims, 30 Drawing Sheets

Related U.S. Application Data is a continuation of application No. 15/999,331, filed on Aug. 17, 2018, now Pat. No. 10,349,208.

(51) Int. Cl.
  *G06N 20/00* (2019.01)
  *G06F 16/29* (2019.01)

(58) Field of Classification Search
  CPC ........ G06N 20/00; G06N 20/20; G06N 5/003; G06F 16/29; H04L 67/18; H04L 43/106
  See application file for complete search history.

(56) References Cited

U.S. PATENT DOCUMENTS

| | | |
|---|---|---|
| 8,660,355 B2 | 2/2014 | Rodriguez et al. |
| 8,832,003 B1 | 9/2014 | Bowers et al. |
| 8,868,254 B2 | 10/2014 | Louboutin |
| 8,941,489 B2 | 1/2015 | Sheshadri et al. |
| 9,210,545 B2 | 12/2015 | Sabatelli et al. |
| 9,280,749 B1 | 3/2016 | Porteous et al. |
| 9,303,997 B2 | 4/2016 | McGavran et al. |
| 9,357,346 B2 | 5/2016 | Jagannath |
| 9,377,319 B2 | 6/2016 | San Filippo et al. |
| 9,584,836 B2 | 2/2017 | Fei et al. |
| 9,584,968 B2 | 2/2017 | Barrand et al. |
| 9,602,970 B1 | 3/2017 | Mahapatra |
| 9,606,716 B2 | 3/2017 | Sharifi et al. |
| 9,652,525 B2 | 5/2017 | Patton et al. |
| 9,654,591 B2 | 5/2017 | Matus |
| 9,706,355 B1 | 7/2017 | Cali et al. |
| 9,712,968 B2 | 7/2017 | Kong et al. |
| 9,712,970 B2 | 7/2017 | Barrand et al. |
| 9,785,974 B1* | 10/2017 | Periasamy ......... G06Q 30/0267 |
| 9,838,843 B1 | 12/2017 | Bajaj et al. |
| 9,841,286 B1 | 12/2017 | Hayward |
| 9,846,999 B1 | 12/2017 | Pickover et al. |
| 9,860,697 B2 | 1/2018 | Frenz |
| 9,916,538 B2 | 3/2018 | Zadeh et al. |
| 9,928,468 B2 | 3/2018 | Katsuki et al. |
| 9,996,853 B2* | 6/2018 | Myers ................ G06F 16/9535 |
| 10,064,007 B1 | 8/2018 | Deluca et al. |
| 10,080,201 B2 | 9/2018 | Taite et al. |
| 10,127,564 B2 | 11/2018 | Heath |
| 10,149,111 B1 | 12/2018 | Subbian |
| 10,165,403 B2 | 12/2018 | Liang et al. |
| 10,171,934 B2 | 1/2019 | Jain et al. |
| 10,175,054 B2 | 1/2019 | Woodard |
| 10,185,948 B2 | 1/2019 | Kumaraguruparan et al. |
| 10,217,028 B1 | 2/2019 | Wang et al. |
| 10,257,660 B2 | 4/2019 | Price et al. |
| 10,278,014 B2 | 4/2019 | Liang et al. |
| 10,318,670 B2* | 6/2019 | Marti ..................... G06F 30/20 |
| 10,349,208 B1 | 7/2019 | Liang et al. |
| 10,380,636 B2 | 8/2019 | Polachi |
| 10,417,076 B2 | 9/2019 | Ciasulli et al. |
| 10,424,185 B2* | 9/2019 | Cordes .................. G08B 25/10 |
| 10,455,363 B2 | 10/2019 | Liang et al. |
| 10,475,064 B2 | 11/2019 | Golden et al. |
| 10,715,962 B2* | 7/2020 | Liang ..................... G06N 20/00 |
| 2002/0111172 A1 | 8/2002 | DeWolf et al. |
| 2003/0064735 A1 | 4/2003 | Spain et al. |
| 2006/0156209 A1 | 7/2006 | Matsura et al. |
| 2007/0026870 A1 | 2/2007 | Spain et al. |
| 2007/0233631 A1 | 10/2007 | Kobayashi et al. |
| 2010/0085947 A1* | 4/2010 | Ringland .......... H04W 28/0226 370/338 |
| 2010/0312599 A1 | 12/2010 | Durst |
| 2011/0081634 A1 | 4/2011 | Kurata et al. |
| 2011/0099045 A1 | 4/2011 | Carr et al. |
| 2011/0190595 A1* | 8/2011 | Bennett ................. A61B 17/42 600/301 |
| 2011/0244919 A1 | 10/2011 | Aller et al. |
| 2012/0053991 A1 | 3/2012 | Shimizu et al. |
| 2012/0135751 A1* | 5/2012 | Mishra .................. H04W 4/029 455/456.1 |
| 2012/0179534 A1 | 7/2012 | Moukas et al. |
| 2012/0284769 A1 | 11/2012 | Dixon et al. |
| 2013/0006522 A1 | 1/2013 | Vellaikal et al. |
| 2013/0066818 A1 | 3/2013 | Assadollahi et al. |
| 2013/0073388 A1 | 3/2013 | Heath |
| 2013/0099977 A1 | 4/2013 | Sheshadri et al. |
| 2013/0225282 A1 | 8/2013 | Williams et al. |
| 2013/0231137 A1 | 9/2013 | Hugie et al. |
| 2013/0275511 A1 | 10/2013 | Wilson et al. |
| 2013/0304869 A1 | 11/2013 | Gupta et al. |
| 2013/0324160 A1 | 12/2013 | Sabatellil et al. |
| 2014/0018096 A1 | 1/2014 | Jagannath |
| 2014/0045529 A1 | 2/2014 | Bolon et al. |
| 2014/0053261 A1 | 2/2014 | Gupta et al. |
| 2014/0067901 A1 | 3/2014 | Shaw |
| 2014/0074604 A1* | 3/2014 | Castillo .............. G06Q 30/0267 705/14.53 |
| 2014/0150100 A1 | 5/2014 | Gupta et al. |
| 2014/0164118 A1 | 6/2014 | Polachi |
| 2014/0164369 A1 | 6/2014 | Nichols et al. |
| 2014/0266984 A1 | 9/2014 | Sharma |
| 2014/0278086 A1 | 9/2014 | San Filippo et al. |
| 2014/0317734 A1 | 10/2014 | Valencia et al. |
| 2014/0337123 A1 | 11/2014 | Nuernberg et al. |
| 2014/0337862 A1 | 11/2014 | Valencia et al. |
| 2014/0342337 A1 | 11/2014 | Bowden et al. |
| 2014/0365307 A1 | 12/2014 | Cheung |
| 2015/0066593 A1 | 3/2015 | Huang et al. |
| 2015/0105944 A1 | 4/2015 | Louboutin |
| 2015/0120530 A1 | 4/2015 | Jung et al. |
| 2015/0163639 A1 | 6/2015 | Kilpatrick, II et al. |
| 2015/0186497 A1 | 7/2015 | Patton et al. |
| 2015/0213497 A1 | 7/2015 | Jain et al. |
| 2015/0278864 A1 | 10/2015 | McDevitt |
| 2015/0287072 A1 | 10/2015 | Golden et al. |
| 2015/0332325 A1 | 11/2015 | Sharma et al. |
| 2015/0332329 A1 | 11/2015 | Luo et al. |
| 2015/0341747 A1 | 11/2015 | Barrand et al. |
| 2015/0373501 A1* | 12/2015 | Dribinski ............. H04W 4/029 455/456.1 |
| 2016/0078485 A1* | 3/2016 | Shim .................... H04W 4/021 705/14.64 |
| 2016/0094944 A1 | 3/2016 | Kong et al. |
| 2016/0196527 A1 | 7/2016 | Bose et al. |
| 2016/0292722 A1* | 10/2016 | Myers ................ G06F 16/9535 |
| 2017/0013408 A1 | 1/2017 | Grzywaczewski et al. |
| 2017/0034592 A1* | 2/2017 | Ray ..................... H04N 21/812 |
| 2017/0055129 A1* | 2/2017 | Schurer ................ H04W 4/021 |
| 2017/0127233 A1 | 5/2017 | Liang et al. |
| 2017/0161659 A1 | 6/2017 | Goldstein et al. |
| 2017/0164649 A1 | 6/2017 | La Cagnina |
| 2017/0171704 A1 | 6/2017 | Frenz |
| 2017/0278022 A1 | 9/2017 | Mimassi |
| 2017/0278202 A1 | 9/2017 | Mimassi |
| 2017/0289756 A1 | 10/2017 | Barrand et al. |
| 2017/0323342 A1 | 11/2017 | Dey et al. |
| 2018/0080793 A1* | 3/2018 | Kapicioglu ........... H04W 4/021 |
| 2018/0260393 A1 | 9/2018 | Liang et al. |
| 2018/0349703 A1 | 12/2018 | Rathod |
| 2018/0350144 A1 | 12/2018 | Rathod |
| 2019/0007793 A1 | 1/2019 | Liang et al. |
| 2019/0014441 A1 | 1/2019 | Diamanti et al. |
| 2019/0045331 A1* | 2/2019 | Liang .................... H04W 4/029 |
| 2019/0098448 A1 | 3/2019 | Jain et al. |
| 2019/0114544 A1 | 4/2019 | Sundaram et al. |
| 2020/0019995 A1* | 1/2020 | Krishnan .............. G06F 16/951 |
| 2020/0134660 A1* | 4/2020 | Kadaster ............. G06Q 30/0255 |

FOREIGN PATENT DOCUMENTS

| | | |
|---|---|---|
| EP | 2541485 A1 | 1/2013 |
| EP | 2820630 A4 | 3/2016 |
| EP | 2570974 B1 | 11/2018 |
| EP | 3146753 B1 | 1/2020 |
| EP | 3622520 A1 | 3/2020 |
| ES | 2527781 B1 | 9/2015 |

(56) References Cited

FOREIGN PATENT DOCUMENTS

| | | | |
|---|---|---|---|
| GB | 2522708 A | 8/2015 |
| JP | 2010533326 A | 10/2010 |
| JP | 4783181 B2 | 9/2011 |
| JP | 5440080 B2 | 3/2014 |
| JP | 5984153 B2 | 9/2016 |
| JP | 2020511716 A | 4/2020 |
| TW | I627987 B | 7/2018 |
| WO | WO2004077291 A1 | 9/2004 |
| WO | WO2013184603 A1 | 12/2013 |
| WO | WO2015058123 A1 | 4/2015 |
| WO | WO2016183766 A1 | 11/2016 |
| WO | WO20160183766 A1 | 11/2016 |
| WO | WO2017079697 A1 | 5/2017 |
| WO | WO2018092016 A1 | 5/2018 |
| WO | WO2020006577 A1 | 1/2020 |

OTHER PUBLICATIONS

Liang, Notice of Allowance, U.S. Appl. No. 15/999,330, dated Dec. 7, 2018, 12 pgs.

Liang, Non-Final Office Action, U.S. Appl. No. 16/506,940, dated Jun. 25, 2020, 6 pgs.

Liang, Non-Final Office Action, U.S. Appl. No. 16/775,191, dated May 6, 2020, 8 pgs.

Liang, Notice of Allowance, U.S. Appl. No. 16/775,191, dated Aug. 18, 2020, 10 pgs.

XAd, Inc., International Search Report and Written Opinion, PCT/US2016/060727, dated Mar. 31, 2017, 7 pgs.

XAd, Inc., International Preliminary Report on Patentability, PCT/US2016/060727, dated May 8, 2018, 6 pgs.

XAd, Inc., Letter of Decision, Japanese Patent Application No. 2018-522739, dated Jan. 7, 2020, 3 pgs.

XAd, Inc., Examination Report No. 1, Australian Application No. 2016-349513, dated Jun. 18, 2019, 4 pgs.

XAd, Inc., Japanese Office Action, JP Patent Application No. JP 2018-522739, dated May 13, 2019, 12 pgs.

XAd, Inc., European Search Report, EP 16863131.5, dated Jun. 13, 2019, 12 pgs.

XAd, Inc., International Search Report and Written Opinion, PCT/US2019/046832, dated Dec. 13, 2019, 10 pgs.

XAd, Inc., Notice of Allowance, U.S. Appl. No. 16/660,686, dated Mar. 3, 2020, 11 pgs.

\* cited by examiner

| Fence ID | Fence Type | Category | Name/Brand | Municipality | Spatial Data | Doc ID |
|---|---|---|---|---|---|---|
| 19-35175 | BC | General | Costco | US/CA/Almaden | a1, a2, ..., ai | 132475 |
| 19-35176 | BP | General | Costco | US/CA/Almaden | b1, b2, ..., bj | 135678 |
| 19-35177 | BR | General | Costco<br>TJ Maxx<br>Red Lobster<br>Trader Joe's<br>Chevy's<br>Barnes&Nobel<br>...<br>Almaden Plaza | US/CA/Almaden | c1, c2, ..., ck | 136572 |
| 19-35163 | BC | Department | TJ Maxx | US/CA/Almaden | d1, d2, ..., dl | 156321 |
| 19-35164 | BP | Department | TJ Maxx | US/CA/Almaden | e1, e2, ..., em | 154376 |
| 19-35151 | BC | Grocery | Trader Joe's | US/CA/Almaden | f1, f2, ..., fn | 256321 |
| | | ...... | ...... | ...... | ...... | |

FIG. 5

| Geo-Bock ID | Spatial Data | Meta Data | | | | |
|---|---|---|---|---|---|---|
| | | City/State | Functionality | Major POI | Demographic | inventory |
| ...... | ...... | ...... | ...... | ...... | ...... | ...... |
| 1234568 | a1, a2, ..., ai | Santa Clara/CA | Residential | Santa Clara High School | ...... | ...... |
| 1234569 | b1, b2, ..., bj | Santa Clara/CA | Retail | New India Bazar | ...... | ...... |
| 1234570 | c1, c2, ..., ck | Santa Clara/CA | Residential | Pomeroy Elementary | ...... | ...... |
| 1234571 | d1, d2, ..., dl | Santa Clara/CA | Retail | Moonlite Shopping Center | ...... | ...... |
| ...... | ...... | ...... | ...... | ...... | ...... | ...... |
| 1234573 | f1, f2, ..., fn | Santa Clara/CA | Recreational | Branham Park | ...... | ...... |
| ...... | ...... | ...... | ...... | ...... | ...... | ...... |

FIG. 7

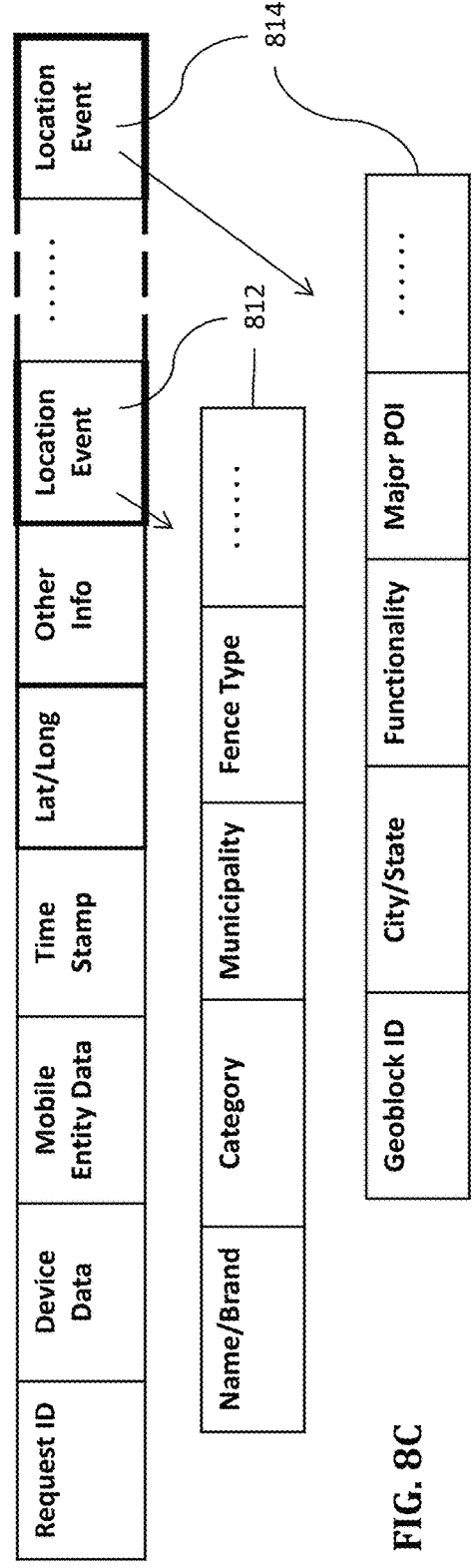

| Request ID | Device Information | | User Information | | | Lat/Long | Location Events | | | App Used | Time Stamp | | Annotations |
| --- | --- | --- | --- | --- | --- | --- | --- | --- | --- | --- | --- | --- | --- |
| | UID | Make/Model | Age | Gndr | Ed | | Geo-Fence | Fence Type | Geo-Block | | Day | Hour | |
| ... | ... | ... | ... | ... | ... | ... | ... | ... | ... | ... | ... | ... | |
| 0965799976 | 36****412 | Samsung S9 | 23 | M | G/S | x.x/x.x | B175 | X | 396841 | A310 | 7/3/2019 | 23:59 | PTF |
| ... | ... | ... | ... | ... | ... | ... | ... | ... | ... | ... | ... | ... | |
| 0936819973 | XX****XXX | Nokia 7.1 | 36 | F | HS | x.x/x.x | Null | Null | 559654 | A027 | 6/21/2019 | 00:45 | Qualified Request |
| 0936519972 | 36****412 | Samsung S9 | 23 | M | G/S | x.x/x.x | B175 | Z | 396841 | A310 | 6/20/2019 | 23:59 | Campaign Start |
| ... | ... | ... | ... | ... | ... | ... | ... | ... | ... | ... | ... | ... | |
| 0555375238 | XX****XXX | Samsung J3 | 42 | F | C/U | x.x/x.x | B168 | Y | 546987 | A547 | 6/15/2019 | 23:57 | PTP |
| ... | ... | ... | ... | ... | ... | ... | ... | ... | ... | ... | ... | ... | |
| 0532123975 | XX****XXX | Iphone 7 | 47 | F | HS | x.x/x.x | B138 | Y | 547412 | A298 | 3/21/2019 | 00:02 | TTF |
| 0532389972 | 36****412 | Samsung S9 | 23 | M | G/S | x.x/x.x | B175 | Z | 396841 | A310 | 3/20/2019 | 23:59 | |
| ... | ... | ... | ... | ... | ... | ... | ... | ... | ... | ... | ... | ... | |
| 0124565241 | XX****XXX | Iphone 10 | 47 | F | HS | x.x/x.x | Null | Null | 135748 | a1 | 3/11/2019 | 00:00 | TTP |
| 0125519737 | XX****XXX | Iphone 6 | 47 | F | HS | x.x/x.x | Null | Null | 335952 | a1 | 3/10/2019 | 23:59 | |
| ... | ... | ... | ... | ... | ... | ... | ... | ... | ... | ... | ... | ... | |
| 0032469974 | XX****XXX | Nokia 7.2 | 25 | M | C/U | x.x/x.x | B176 | Y | 681247 | A215 | 3/1/2019 | 00:00 | |
| ... | ... | ... | ... | ... | ... | ... | ... | ... | ... | ... | ... | ... | |

FIG. 9

| Request ID | Device Information | | User Information | | | Feedback | | | Time Stamp | |
|---|---|---|---|---|---|---|---|---|---|---|
| | UID | Make/Model | Age | Gndr | Ed | Doc ID | App | Event | Day | Hour |
| ... | ... | ... | ... | ... | ... | ... | ... | ... | ... | ... |
| 0987563241 | XX****XXX | Nokia 7.1 | 25 | M | G/S | D432 | A346 | Impression | 7/3/2019 | 13:52 |
| ... | ... | ... | ... | ... | ... | ... | ... | ... | ... | ... |
| 0948562372 | XX****XXX | Samsung S9 | 46 | F | HS | D675 | A772 | Click | 6/21/2019 | 20:07 |
| 0943256875 | XX****XXX | Iphone 7 | 33 | M | G/S | D432 | A461 | Impression | 6/20/2019 | 21:52 |
| ... | ... | ... | ... | ... | ... | ... | ... | ... | ... | ... |
| 0589653341 | XX****XXX | Iphone 6 | 52 | F | C/U | D432 | D783 | Impression | 6/15/2019 | 08:07 |
| ... | ... | ... | ... | ... | ... | ... | ... | ... | ... | ... |
| 0557896523 | XX****XXX | Iphone 8 | 27 | F | HS | D373 | D541 | Impression | 3/21/2019 | 00:02 |
| 0553287652 | XX****XXX | Samsung S9 | 43 | M | G/S | D675 | D346 | Impression | 3/20/2019 | 23:59 |
| ... | ... | ... | ... | ... | ... | ... | ... | ... | ... | ... |
| 0136528972 | XX****XXX | Nokia 7.2 | 41 | F | HS | D562 | D573 | Impression | 3/11/2019 | 07:54 |
| 0135268242 | XX****XXX | Samsung J3 | 29 | F | HS | D856 | D346 | Click | 3/10/2019 | 20:21 |
| ... | ... | ... | ... | ... | ... | ... | ... | ... | ... | ... |
| 005369863 | XX****XXX | Iphone 10 | 18 | M | C/U | D691 | D346 | Impression | 3/1/2019 | 06:23 |
| ... | ... | ... | ... | ... | ... | ... | ... | ... | ... | ... |

FIG. 10

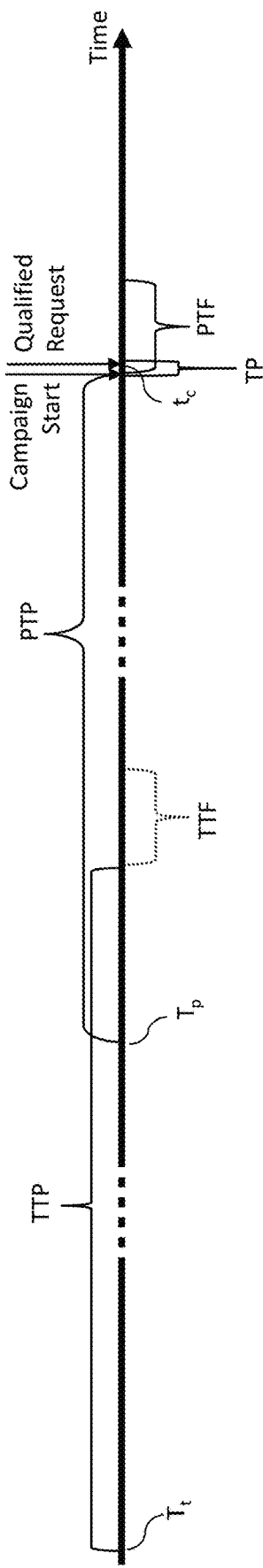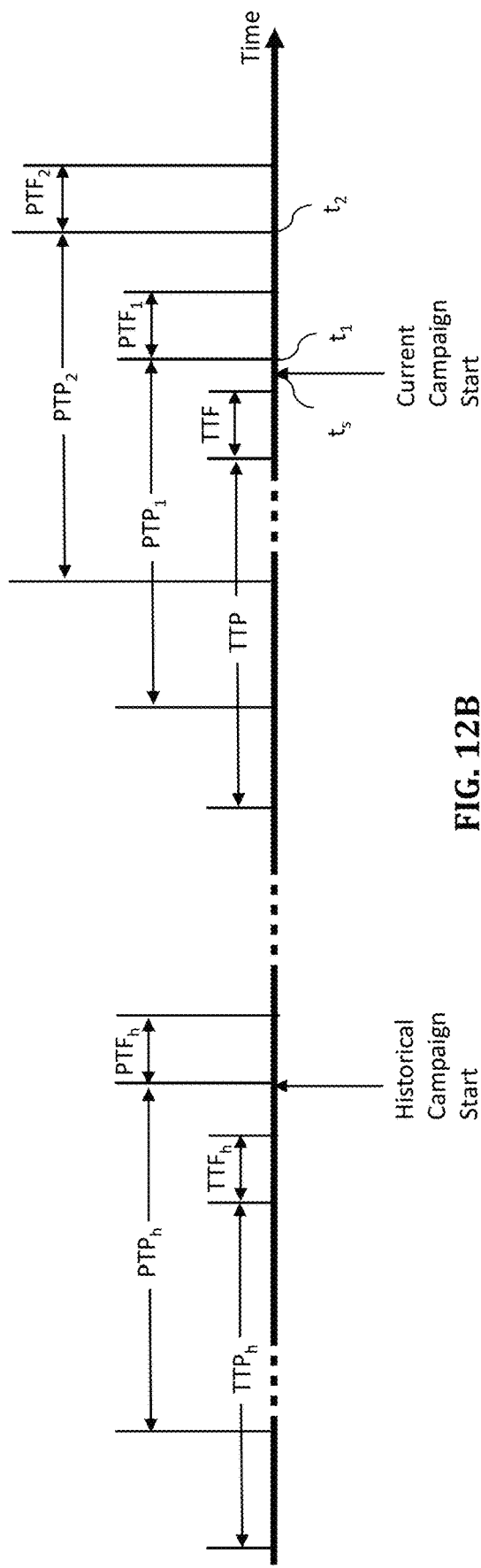
FIG. 12A
FIG. 12B

1410

| UID | Device & User Meta Data | | | | | | | | | | | | | |
|---|---|---|---|---|---|---|---|---|---|---|---|---|---|---|
| | Age | G | E | ... | GBx | | | | | | GBy | | | |
| | | | | | Number of Visits | | | Time of Last Visit | Average Length of Stay | Number of Visits | | | Time of Last Visit | Average Length of Stay |
| | | | | | TB1 | TB2 | TB3 | | | TB1 | TB2 | TB3 | | |
| 36***412 | 35 | M | C | ... | 10 | 7 | 3 | 8 | 0.2 | 0 | 0 | 21 | 2 | 0.7 |

| Bx | | | | | By | | | | | |
|---|---|---|---|---|---|---|---|---|---|---|
| Number of Visits | | | Time of Last Visit | Average Length of Stay | Number of Visits | | | Time of Last Visit | Average Length of Stay | |
| TB1 | TB2 | TB3 | | | TB1 | TB2 | TB3 | | | |
| 0 | 5 | 2 | 6 | 0.3 | 3 | 9 | 0 | 3 | 0.5 | |

| Docx | | | | Docy | | | |
|---|---|---|---|---|---|---|---|
| Imp | C/C | S/A | | Imp | C/C | S/A | |
| 6 | 0 | 0 | | 3 | 1 | 1 | |

| Appx | | | | | | Appy | | | | | |
|---|---|---|---|---|---|---|---|---|---|---|---|
| Number of Uses | | | Time of Last Use | Average Length of Use | | Number of Uses | | | Time of Last Use | Average Length of Use | |
| TB1 | TB2 | TB3 | | | | TB1 | TB2 | TB3 | | | |
| 4 | 0 | 8 | 1 | 0.1 | | 0 | 0 | 30 | 2 | 0.5 | |

1420

36***412; 35, M, C, ...; GBx: 10, 7, 3, 8, 0.2, GB3; ...; GBy: 0, 0, 21, 2, 0.7, GB9; TBx: 0, 5, 6, 0.3, GB55; ...; TBy: 3, 9, 0, 3, 0.5, GB6; Docx: 6, 0, 0; ...; Docy: 3, 1, 1; Appx:4, 0, 8, 1, 0.1; Appy: 0, 0, 30, 2, 0.5; ...

FIG. 14

| UID | Device & User Meta Data | | | | GBB₁ | | | | | GBBₘ | | | | |
|---|---|---|---|---|---|---|---|---|---|---|---|---|---|---|
| | | | | | Number of Visits | | | Time of Last Visit | Average Length of Stay | Number of Visits | | | Time of Last Visit | Average Length of Stay |
| | Age | G | ... | E | TB1 | TB2 | TB3 | | | TB1 | TB2 | TB3 | | |
| 52**256 | 35 | M | | C | 32 | 15 | 21 | 3 | 0.7 | 16 | 5 | 83 | 1 | 1 |

| BB₁ (or BBB₁) | | | | | BBₙ (or BBBₙ) | | | | | Mobility | | Retail Geoblocks | |
|---|---|---|---|---|---|---|---|---|---|---|---|---|---|
| Number of Visits | | | Time of Last Visit | Average Length of Stay | Number of Visits | | | Time of Last Visit | Average Length of Stay | Brands | GB Ratio | Weighted Visits | Net Visits |
| TB1 | TB2 | TB3 | | | TB1 | TB2 | TB3 | | | | | | |
| 11 | 0 | 3 | 12 | 0.8 | 0 | 25 | 7 | 3 | 0.3 | 27 | 0.08 | 3.2 | 11 |

| MFVGB-1 | | | | MFVGB-n | | | | Feedbacks | | |
|---|---|---|---|---|---|---|---|---|---|---|
| Number of Visits | | | Distance from nearest location in the location group | Number of Visits | | | Distance from nearest location in the location group | Pre-exposure | C/C Ratio | S/A Ratio |
| TB1 | TB2 | TB3 | | TB1 | TB2 | TB3 | | | | |
| 37 | 0 | 82 | 3.6 | 3 | 21 | 35 | 5.7 | 17 | 0.06 | 0.00 |

FIG. 16

| UID | Predicted Probability of Visits during PTF |
|---|---|
| XX\*\*\*XXX | 1% |
| XX\*\*\*XXX | 23% |
| XX\*\*\*XXX | 67% |
| XX\*\*\*XXX | 98% |
| XX\*\*\*XXX | 41% |
| ..... | ..... |
| XX\*\*\*XXX | 50% |
| XX\*\*\*XXX | 62% |
| XX\*\*\*XXX | 88% |
| XX\*\*\*XXX | 30% |
| ..... | ..... |
| XX\*\*\*XXX | 99% |
| ..... | ..... |

FIG. 17B

| UID | @LG during TTF |
|---|---|
| 76\*\*\*932 | 0 |
| 55\*\*\*848 | 1 |
| 39\*\*\*236 | 0 |
| 48\*\*\*352 | 1 |
| ... | ... |
| 93\*\*\*677 | 0 |
| 72\*\*\*842 | 0 |
| ... | ... |

FIG. 17A

| Device Information | Sampled Impressions (or Qualification) Based on Data in Feedback Log | | Detected Visits Based on Data in Request Log | |
|---|---|---|---|---|
| UID | Day | Hour | Day | Hour |
| ⋮ | ⋮ | ⋮ | ⋮ | ⋮ |
| XX****XXX | 6/07/2019 | 10:05 | | |
| ⋮ | ⋮ | ⋮ | ⋮ | ⋮ |
| XX****XXX | 6/17/2019 | 14:52 | 7/1/2019 | 15:27 |
| XX****XXX | 6/20/2019 | 00:02 | 6/27/2019 | 16:12 |
| ⋮ | ⋮ | ⋮ | ⋮ | ⋮ |
| XX****XXX | 6/7/2019 | 08:07 | | |
| XX****XXX | 6/11/2019 | 00:02 | | |
| XX****XXX | 6/8/2019 | 23:59 | | |
| ⋮ | ⋮ | ⋮ | ⋮ | ⋮ |
| XX****XXX | 6/18/2019 | 07:54 | | |
| XX****XXX | 6/15/2019 | 20:21 | 6/21/2019 | 10:21 |
| ⋮ | ⋮ | ⋮ | ⋮ | ⋮ |

FIG. 19

| UID of impressed (or qualified) mobile devices | Detected Visits | Predicted Probability of Visit |
|---|---|---|
| 36***412 | 0 | 0.1% |
| 56***845 | 0 | 0.12% |
| ...... | ...... | ...... |
| 36***963 | 1 | 1% |
| 45***895 | 0 | 1.01% |
| 36***412 | ...... | ...... |
| 78***697 | 1 | 1.97% |
| 89***776 | 0 | 2% |
| ...... | ...... | ...... |
| 89***776 | 1 | 99.1% |
| 94***321 | 0 | 99.13% |
| ...... | ...... | ...... |
| 67***423 | 1 | 99.98% |

- 1st probability bracket: rows 1–2
- 2st probability bracket: rows 4–5 ... 7–8
- 100th probability bracket: rows 10–11 ... 13

FIG. 20

| Campaign ID | Pricing Model | Target Audience | | | | | Device | Ad Type | App | ... | Target POIs | | |
|---|---|---|---|---|---|---|---|---|---|---|---|---|---|
| | | Age | Gndr | Ed | Segment | Geographic Area | | | | | Brand | Geo-Fence | Geographic Area |
| ... | ... | ... | ... | ... | ... | ... | ... | ... | ... | ... | ... | ... | ... |
| C34256 | CPC | 20-30 | M/F | G/S | Loyalty | xxxxx | iPhone 8+ | Banner | Safari | ... | xxxxx | Radial | xxxxxx |
| C97598 | CPV | 20-40 | F | HS | Conquest | xxxxx | Galaxy S9+ | Animation | Maps | ... | xxxxx | Premise | Xxxx/XX |
| C12879 | CPM | 20-35 | M | G/S | Loyalty | xxxxx | xxxx | Interactive | Spotify | ... | xxxxx | NH | xxxxx |
| C78865 | CPV | 40-60 | M/F | C/U | Loyalty | Xxxxx/XX | iPhone 8+ | Banner | Safari | ... | xxxxx | Premise | Xxxx/XX |
| ... | ... | ... | ... | ... | ... | ... | ... | ... | ... | ... | ... | ... | ... |
| C98875 | CPC | | F | HS | Conquest | Xxxxx/XX | iPhone 8+ | Banner | Spotify | ... | xxxxx | NH | Xxxx/XX |
| C25364 | CPM | 20-35 | M | G/S | Conquest | xxxxx | xxxx | Video | Safari | ... | xxxxx | Radial | xxxx |
| ... | ... | ... | ... | ... | ... | ... | ... | ... | ... | ... | ... | ... | ... |
| C52368 | CPV | 50+ | M/F | HS | Conquest | Xxxxx/XX | iPhone 6+ | Banner | Safari | ... | xxxxx | Premise | xxxxx |
| C52687 | CPC | 20-50 | F | HS | Loyalty | xxxxx | xxxx | Video | xxxx | ... | xxxxx | Premise | Xxxx/XX |
| ... | ... | ... | ... | ... | ... | ... | ... | ... | ... | ... | ... | ... | ... |
| C15287 | CPV | 40+ | M | C/U | Loyalty | xxxxx | xxxx | Video | xxxx | ... | xxxxx | Radial | xxxxx |
| ... | ... | ... | ... | ... | ... | ... | ... | ... | ... | ... | ... | ... | ... |

FIG. 22

| Campaign ID | Target POIs | | | | Target Audience | | | | | | Device | Ad Type | App |
|---|---|---|---|---|---|---|---|---|---|---|---|---|---|
| | Visits/wk | % of brand | Geo-fence | Category | Age | Gndr | Ed | Segment | Geographic Area | | | | |
| ... | ... | ... | ... | ... | ... | ... | ... | ... | ... | ... | ... | ... | ... |
| C34256 | 5k-10k | 5 | Radial | General | 20-30 | M/F | G/S | Loyalty | xxxxx | iPhone 8+ | Banner | Safari |
| C97598 | 5k-10k | 10 | Premise | Department | 20-40 | F | HS | Conquest | xxxxx | Galaxy S9+ | Animation | Maps |
| C12879 | 10k-15k | 3 | NH | Department | 20-35 | M | G/S | Loyalty | xxxxx | xxxx | Interactive | Spotify |
| C78865 | 3k-5k | 20 | Premise | Grocery | 40-60 | M/F | C/U | Loyalty | Xxxxx/XX | iPhone 8+ | Banner | Safari |
| ... | ... | ... | ... | ... | ... | ... | ... | ... | ... | ... | ... | ... |
| C98875 | 2k-3k | 15 | NH | Apparel | | F | HS | Conquest | Xxxxx/XX | iPhone 8+ | Banner | Spotify |
| C25364 | 1k-2k | 12 | Radial | Sports | 20-35 | M | G/S | Conquest | xxxxx | xxxx | Video | Safari |
| ... | ... | ... | ... | ... | ... | ... | ... | ... | ... | ... | ... | ... |
| C52368 | 1k-2k | 10 | Premise | Restaurant | 50+ | M/F | HS | Conquest | Xxxxx/XX | iPhone 6+ | Banner | Safari |
| C52687 | 20k-30k | 30 | Premise | Shopping Mall | 20-50 | F | HS | Loyalty | xxxxx | xxxx | Video | xxxx |
| ... | ... | ... | ... | ... | ... | ... | ... | ... | ... | ... | ... | ... |
| C15287 | 10k-15k | 23 | Radial | Theatre | 40+ | M | C/U | Loyalty | xxxxx | xxxx | Video | xxxx |
| ... | ... | ... | ... | ... | ... | ... | ... | ... | ... | ... | ... | ... |

FIG. 23

| Campaign A | Campaign B | Campaign A Features | | | | | | | | | | Campaign B Features | | | | | | | | Measured Difference |
|---|---|---|---|---|---|---|---|---|---|---|---|---|---|---|---|---|---|---|---|---|
| ... | ... | ... | ... | ... | ... | ... | ... | ... | ... | ... | ... | ... | ... | ... | ... | ... | ... | ... | ... | ... |
| C34256 | C97598 | xxx | xxx | xxx | xxx | ... | xxx | xxx | xxx | xxx | xxx | xxx | xxx | ... | xxx | xxx | xxx | xxx | xxx | 10% |
| C97598 | C12879 | xxx | xxx | xxx | xxx | ... | xxx | xxx | xxx | xxx | xxx | xxx | xxx | ... | xxx | xxx | xxx | xxx | xxx | 5% |
| C12879 | C78865 | xxx | xxx | xxx | xxx | ... | xxx | xxx | xxx | xxx | xxx | xxx | xxx | ... | xxx | xxx | xxx | xxx | xxx | 3% |
| C78865 | C98875 | xxx | xxx | xxx | xxx | ... | xxx | xxx | xxx | xxx | xxx | xxx | xxx | ... | xxx | xxx | xxx | xxx | xxx | 17% |
| ... | ... | ... | ... | ... | ... | ... | ... | ... | ... | ... | ... | ... | ... | ... | ... | ... | ... | ... | ... | ... |
| C98875 | C25364 | xxx | xxx | xxx | xxx | ... | xxx | xxx | xxx | xxx | xxx | xxx | xxx | ... | xxx | xxx | xxx | xxx | xxx | 23% |
| C25364 | C52368 | xxx | xxx | xxx | xxx | ... | xxx | xxx | xxx | xxx | xxx | xxx | xxx | ... | xxx | xxx | xxx | xxx | xxx | 31% |
| ... | ... | ... | ... | ... | ... | ... | ... | ... | ... | ... | ... | ... | ... | ... | ... | ... | ... | ... | ... | ... |
| C52368 | C52687 | xxx | xxx | xxx | xxx | ... | xxx | xxx | xxx | xxx | xxx | xxx | xxx | ... | xxx | xxx | xxx | xxx | xxx | 2% |
| C52687 | C15287 | xxx | xxx | xxx | xxx | ... | xxx | xxx | xxx | xxx | xxx | xxx | xxx | ... | xxx | xxx | xxx | xxx | xxx | 12% |
| ... | ... | ... | ... | ... | ... | ... | ... | ... | ... | ... | ... | ... | ... | ... | ... | ... | ... | ... | ... | ... |
| C15287 | C65478 | xxx | xxx | xxx | xxx | ... | xxx | xxx | xxx | xxx | xxx | xxx | xxx | ... | xxx | xxx | xxx | xxx | xxx | 1% |
| ... | ... | ... | ... | ... | ... | ... | ... | ... | ... | ... | ... | ... | ... | ... | ... | ... | ... | ... | ... | ... |

FIG. 24

| Historical Campaigns | Historical Campaign Features | | | | | | Current Campaign Features | | | | | | | Predicted Difference |
|---|---|---|---|---|---|---|---|---|---|---|---|---|---|
| C34256 | xxx | xxx | xxx | ... | xxx | xxx | xxx | xxx | ... | xxx | xxx | xxx | ... |
| C97598 | xxx | xxx | xxx | ... | xxx | xxx | xxx | xxx | ... | xxx | xxx | xxx | 21% |
| C12879 | xxx | xxx | xxx | ... | xxx | xxx | xxx | xxx | ... | xxx | xxx | xxx | 2% |
| C78865 | xxx | xxx | xxx | ... | xxx | xxx | xxx | xxx | ... | xxx | xxx | xxx | 5% |
| ... | ... | ... | ... | ... | ... | ... | ... | ... | ... | ... | ... | ... | 11% |
| C98875 | xxx | xxx | xxx | ... | xxx | xxx | xxx | xxx | ... | xxx | xxx | xxx | ... |
| C25364 | xxx | xxx | xxx | ... | xxx | xxx | xxx | xxx | ... | xxx | xxx | xxx | 32% |
| ... | ... | ... | ... | ... | ... | ... | ... | ... | ... | ... | ... | ... | 16% |
| C52368 | xxx | xxx | xxx | ... | xxx | xxx | xxx | xxx | ... | xxx | xxx | xxx | ... |
| C52687 | xxx | xxx | xxx | ... | xxx | xxx | xxx | xxx | ... | xxx | xxx | xxx | 1% |
| ... | ... | ... | ... | ... | ... | ... | ... | ... | ... | ... | ... | ... | 27% |
| C15287 | xxx | xxx | xxx | ... | xxx | xxx | xxx | xxx | ... | xxx | xxx | xxx | ... |
| ... | ... | ... | ... | ... | ... | ... | ... | ... | ... | ... | ... | ... | 2% |
| | | | | | | | | | | | | | ... |

FIG. 26

| Historical Campaign ID | Predicted Difference from Current Campaign |
|---|---|
| C25682 | 1.10% |
| C65248 | 1.11% |
| C32658 | 1.15% |
| ... | |
| C78865 | 2.09% |
| ... | |
| C36254 | 11.7% |
| C32568 | 12.1% |
| ... | |
| C52365 | 32.2% |
| C21356 | 33.7% |
| ... | |
| C21458 | 41.5% |
| ... | |

Closest historical campaigns: C25682, C65248, C32658

FIG. 27

SYSTEMS AND METHODS FOR CALIBRATED LOCATION PREDICTION

CROSS REFERENCE TO RELATED APPLICATION

This application is a continuation-in-part of U.S. patent application Ser. No. 16/506,940, filed on Jul. 9, 2019, entitled "Systems and Methods for Real-Time Prediction of Mobile Device Locations," which is a continuation of U.S. patent application Ser. No. 15/999,331, filed on Aug. 17, 2018, now U.S. Pat. No. 10,349,208. Each of the above applications is hereby incorporated by reference in its entirety.

FIELD

The present disclosure is related to location-based information technologies, and more particularly to systems and methods for calibrated location prediction.

DESCRIPTION OF RELATED ART

Mobile device locations are becoming more commonly available to mobile service providers. Location-based information technologies are rapidly developing to effectively translate received location signals, which are typically expressed in (latitude, longitude) pairs, into meaningful signals such as interests and patterns that are useful for serving relevant information to mobile users in the process of providing mobile services.

SUMMARY

According to some embodiments, a system for location prediction includes one or more databases storing therein datasets associated with mobile devices, wherein a respective dataset identifies an associated mobile device, and includes a respective time stamp and at least one respective event involving the associated mobile device at a time indicated by the respective time stamp. In some embodiments, the datasets include datasets derived from information requests related to mobile devices communicating with the packet-based network. In some embodiments, the datasets further include datasets derived from feedbacks about actions on the mobile devices, such as impressions, clicks, calls and/or secondary actions. The system further includes a feature engineering module configured to construct a training feature space including a plurality of training feature sets corresponding, respectively, to a plurality of mobile devices, and to extract a plurality of labels corresponding, respectively, to the plurality of mobile devices. In some embodiments, a respective training feature set corresponding to a respective mobile device includes features constructed using datasets associated with the respective mobile device and having time stamps in a training time period. In some embodiments, a specific label corresponding to a specific mobile device indicates whether the specific mobile device has had at least one location event at any of one or more predefined places of a location group during a training time frame. The system further includes a machine learning module configured to train a location prediction model corresponding to the location group using the feature space and the plurality of labels.

In some embodiments, the system further includes a front-end server configured to receive and process information requests and to store processed information requests as datasets in the one or more databases, and a prediction unit configured to predict probabilities of mobile devices to have location events at any of one or more target points of interest (POIs) during certain time frames of an information campaign. In some embodiments, a mobile device has a location event at a certain location when an information request associated with the mobile device (or location data included in the information request) triggers a geo-fence of the certain location. In some embodiments, the front-end server is configured to receive a first information request associated with a first mobile device, and to determine if the first information request qualifies for the information campaign based on request data associated with the first information request and a set of campaign parameters of the information campaign, the set of campaign parameters including parameters specifying one or more target places of interest (POIs).

In some embodiments, the front-end server is further configured to receive a first information request associated with a first mobile device, and to determine if the first information request qualifies for the information campaign based on data associated with the first information request and a set of campaign parameters of the information campaign. The set of campaign parameters include parameters specifying one or more target places of interest (POIs). In some embodiments, the front-end server is further configured to, in response to the first information request qualifying for the information campaign, present the first information request for fulfillment based at least in part on a first predicted probability.

In some embodiments, the prediction unit includes a prediction module configured to apply the prediction model to a first feature set corresponding to the first mobile device to obtain a first prediction result. The first feature set is constructed using datasets associated with (e.g., identifying) the first mobile device and having time stamps in a first prediction time period. In some embodiments, the prediction unit further includes a calibration module configured to train a calibration model corresponding to the information campaign, and a calibrated prediction module configured to apply the calibration model to the first prediction result to obtain the first predicted probability.

In some embodiments, the calibration model is trained in-flight after the information campaign has been running for a predetermined period of time, and the calibration module is configured to: select a group of mobile devices, each of the group of mobile devices has been impressed with information associated with the information campaign during the predetermined period of time; obtain predicted probabilities of the group of mobile devices to have location events at the one or more target POIs during a prediction time frame; and allocate the group of mobile devices to a plurality of probability brackets corresponding, respectively, to a plurality of ranges of predicted probabilities, such that mobile devices allocated to a specific probability bracket have predicted probabilities in a specific range. The calibration module is further configured to: after the prediction time frame, determine a respective visitation rate corresponding to each respective probability bracket, the respective visitation rate corresponding to a proportion of the mobile devices in the respective probability bracket having had at least one location event at any of the one or more target POIs during the prediction time frame; and machine train a calibration model for the information campaign based at least in part on the visitation rates corresponding, respectively, to the plurality of probability brackets.

In some embodiments, the calibration model is trained at cold start (e.g., shortly before or soon after (e.g. within a day before or after) a start of the information campaign), and the calibration module is configured to: select a first plurality of historical campaigns, each of the first plurality of historical campaigns having a corresponding historical calibration model; for each respective historical campaign of the first plurality of historical campaigns, estimate a respective difference measure corresponding to the respective historical campaign, the respective difference measure indicating an estimated difference between the information campaign and the respective historical campaign; select one or more similar campaigns from the first plurality of historical campaigns, wherein one or more estimated different measures corresponding to the one or more similar campaigns are less than any of the difference measures corresponding to other historical campaigns of the first plurality of historical campaigns; and obtain the prediction calibration model for the information campaign using one or more historical calibration models corresponding to the one or more similar campaigns.

In some embodiments, the calibration module is further configured to: obtain a calibration model for each of a second plurality of historical campaigns; and form a plurality of distinct campaign pairs from the second plurality of historical campaigns, each campaign pair of the plurality of campaign pairs including two distinct historical campaigns. The calibration module is further configured to construct a campaign feature space, which includes, for each specific campaign pair of the plurality of campaign pairs, a set of historical campaign features from campaign parameters associated with the specific campaign pair. The calibration module is further configured to: determine campaign difference labels corresponding, respectively, to the plurality of distinct campaign pairs using calibration models of the plurality of distinct campaign pairs; and machine train the campaign comparison model using the campaign feature space and campaign difference labels.

In some embodiments, a method is performed at one or more computer systems coupled to a packet-based network. Each of the one or more computer systems includes at least one processor, and at least one of the one or more computer systems includes or has access to one or more databases storing therein datasets associated with mobile devices. A respective dataset identifies an associated mobile device, and includes a respective time stamp and at least one respective event involving the associated mobile device at a time indicated by the respective time stamp. In some embodiments, the datasets include datasets derived from information requests associated with mobile devices communicating with the packet-based network. In some embodiments, the datasets further include datasets derived from feedbacks about actions on the mobile devices, such as impressions, clicks, calls and/or secondary actions. In some embodiments, the at least one respective event includes a location event. In some embodiments, the at least one respective event includes one or more of an impression of certain information on a mobile device, a click on a link to additional information made on the mobile device, and/or a call or secondary action taken in response to the certain information.

In some embodiments, the method comprises constructing a training feature space including a plurality of training feature sets corresponding, respectively, to a plurality of mobile devices, wherein a respective training feature set corresponding to a respective mobile device includes features constructed using datasets associated with the respective mobile device and having time stamps in a training time period, and obtaining a plurality of labels corresponding, respectively, to the plurality of mobile devices. A specific label corresponding to a specific mobile device indicates whether the specific mobile device has had at least one location event at any of one or more predefined places of a location group during a training time frame. The method further comprises machine training a location prediction model corresponding to the location group using the training feature space and the plurality of labels.

In some embodiments, the method further comprises receiving a first information request during an information campaign, the first information request identifies a first mobile device and includes a first time stamp and a first location of the first mobile device at a time indicated by the first time stamp, and determining if the first information request qualifies for the information campaign based on data associated with the first information request and a set of campaign parameters of the information campaign, the set of campaign parameters including parameters specifying one or more target places of interest (POIs). In response to the first information request qualifying for the information campaign, the method proceeds to predicting a first probability of the first mobile device to have a location event at any of the one or more target POIs during a first prediction time frame after the first time, and presenting the first information request for fulfillment based at least in part on the first predicted probability. In some embodiments, presenting the first information request for fulfillment based at least in part on the first predicted probability comprises placing a bid for the first information request with a bid price based at least in part on the first predicted probability.

In some embodiments, the method further comprises, before receiving the first information request, training a prediction calibration model corresponding to the information campaign. In some embodiments, predicting the first probability of the first mobile device includes applying the location prediction model to a first feature set corresponding to the first mobile device to obtain a first prediction result; and applying the prediction calibration model to the first prediction result to obtain the first probability. In some embodiments, the first feature set is constructed using datasets associated with the first mobile device and having time stamps in a first prediction time period before the first time.

In some embodiments, the prediction calibration model corresponding to the information campaign is trained in-flight, after the information campaign has been running for a predetermined amount of time, and training the prediction calibration model includes: selecting a group of mobile devices, each of the group of mobile devices has been impressed with information associated with the information campaign; obtaining predicted probabilities of the group of mobile devices to have location events at the one or more target POIs during a prediction time frame; allocating the group of mobile devices to a plurality of probability brackets corresponding, respectively, to a plurality of ranges of predicted probabilities, such that mobile devices allocated to a specific probability bracket have predicted probabilities in a specific range; after the prediction time frame, for each respective probability bracket, determining a respective visitation rate corresponding to the respective probability bracket, the respective visitation rate corresponding to a proportion of mobile devices allocated to the respective probability bracket having had at least one location event at any of the one or more target POIs during the prediction time frame; and machine training a calibration model for the information campaign based at least in part on the visitation rates corresponding, respectively, to the plurality of probability brackets.

In some embodiments, obtaining predicted probabilities of the group of mobile devices to includes: constructing a prediction feature space including a plurality of prediction feature sets corresponding, respectively, to the group of mobile devices, wherein a specific prediction feature set corresponding to a specific mobile device includes features constructed using datasets associated with the specific mobile device and having time stamps in the prediction time period; and applying the prediction model to the prediction feature space to obtain the predicted probabilities of the group of mobile devices.

In some embodiments, the respective visitation rate is determined based at least in part on information requests associated with the mobile devices allocated to the respective probability bracket and having time stamps in the prediction time frame.

In some embodiments, the prediction calibration model corresponding to the information campaign is trained at cold start (e.g., shortly before or shortly after (e.g., within a day before or after) a start of the information campaign), and training the prediction calibration model includes: selecting a first plurality of historical campaigns, each of the first plurality of historical campaigns having a corresponding historical calibration model; for each respective historical campaign of the first plurality of historical campaigns, estimating a respective difference measure corresponding to the respective historical campaign, the respective difference measure indicating an estimated difference between the information campaign and the respective historical campaign; selecting one or more similar campaigns from the first plurality of historical campaigns, wherein one or more estimated different measures corresponding to the one or more similar campaigns are less than any of the difference measures corresponding to other historical campaigns of the first plurality of historical campaigns; and obtaining the prediction calibration model for the information campaign using one or more historical calibration models corresponding to the one or more similar campaigns.

In some embodiments, the one or more similar campaigns include multiple similar campaigns, and wherein the prediction calibration model is obtained as an average of multiple historical calibration models corresponding to the multiple similar campaigns. In some embodiments, estimating the respective difference measure comprises: applying a campaign comparison model to a set of campaign features constructed using campaign parameters of the information campaign and the respective historical campaign to obtain the respective estimated difference measure corresponding to the respective historical campaign.

In some embodiments, the method further comprises: obtaining a calibration model for each of a second plurality of historical campaigns; forming a plurality of distinct campaign pairs from the second plurality of historical campaigns, each campaign pair of the plurality of campaign pairs including two distinct historical campaigns; constructing a campaign feature space, including, for each specific campaign pair of the plurality of campaign pairs constructing a set of historical campaign features from campaign parameters associated with the specific campaign pair; determining campaign difference labels corresponding, respectively, to the plurality of distinct campaign pairs using calibration models of the plurality of distinct campaign pairs; and machine training the campaign comparison model using the campaign feature space and campaign difference labels.

In some embodiments, obtaining a calibration model for each of the second plurality of historical campaigns comprises, for a first historical campaign: selecting a set of mobile devices, each of the set of mobile devices has been impressed with information associated with the first historical campaign; obtaining predicted probabilities of the set of mobile devices to be any of one or more POIs associated with the first historical campaign during a historical time frame; allocating the set of mobile devices to a plurality of prediction brackets corresponding, respectively, to a plurality of ranges of prediction probabilities, such that mobile devices allocated to a specific prediction bracket have prediction probabilities in a specific range; after the historical time frame, for each respective prediction bracket, determining a respective historical visitation rate corresponding to the respective prediction bracket, the respective historical visitation rate corresponding to a proportion of mobile devices allocated to the respective prediction bracket having had at least one location event at any of the one or more POIs associated with the first historical campaign during the historical time frame; and machine training a calibration model for the first historical campaign based at least in part on the historical visitation rates corresponding, respectively, to the plurality of prediction brackets.

In some embodiments, the datasets associated with the respective mobile device and having time stamps in a training time period include datasets derived from information requests associated with the respective mobile device during the training time period, and may further include datasets derived actions on the respective mobile device during the training time period, such as impressions, clicks, calls and/or secondary actions. In some embodiments, the respective training feature set corresponding to the respective mobile device includes location features and non-location features. The location features are based on location events triggered by information requests associated with the respective mobile device during the training time period, which may include location events based on predefined geographical regions and location events based on predefined geo-fences associated with points of interest. In some embodiments, the first feature set corresponding to the first mobile device includes first location features and first non-location features. The first location features are based on location events triggered by information requests associated with the first mobile device during the first prediction time period, which may include location events based on predefined geographical regions and location events based on predefined geo-fences associated with points of interest. In some embodiments, each of the predefined geographical regions borders at least one public road or natural boundary.

BRIEF DESCRIPTION OF THE DRAWINGS

FIG. 5 is a table illustrating some of the content in a geo-fence database according to certain embodiments.

FIG. 7 is a table illustrating some of the content in a geo-block database according to certain embodiments.

FIGS. 8A-8C are block diagrams illustrating request data at different stages of processing according to certain embodiments.

FIG. 9 is a table illustrating some of the content in a request log according to certain embodiments.

FIG. 10 is a table illustrating some of the content in a feedback log according to certain embodiments.

FIGS. 12A-12B are diagrams illustrating time periods and time frames for training and applying location prediction models and calibration models according to certain embodiments.

FIG. 14 includes tables illustrating extracted mobile device data corresponding to a time period according to certain embodiments.

FIG. 16 includes tables of a set of features in a feature space according to certain embodiments.

FIG. 17A is a table illustrating a set of labels corresponding to a time frame according to certain embodiments.

FIG. 17B is a table illustrating examples of location prediction results according to certain embodiments.

FIG. 19 is a table illustrating impression and visitation events associated with various mobile devices according to certain embodiments.

FIG. 20 is a table illustrating detected visitation events and predicted probability of visitation for a set of mobile devices according to certain embodiments.

FIG. 22 is a plot illustrating calibration models of a pair of historical campaigns according to certain embodiments.

FIG. 23 is a table illustrating campaign parameters according to certain embodiments.

FIG. 24 is a table illustrating campaign features according to certain embodiments.

FIG. 26 is a table illustrating a feature space for applying the campaign comparison model to obtain predicted difference values between a current campaign and a set of historical campaigns according to certain embodiments.

FIG. 27 is a table illustrating selection of one or more similar historical campaigns based on the predicted difference values according to certain embodiments.

DESCRIPTION OF THE EMBODIMENTS

Figure 1:
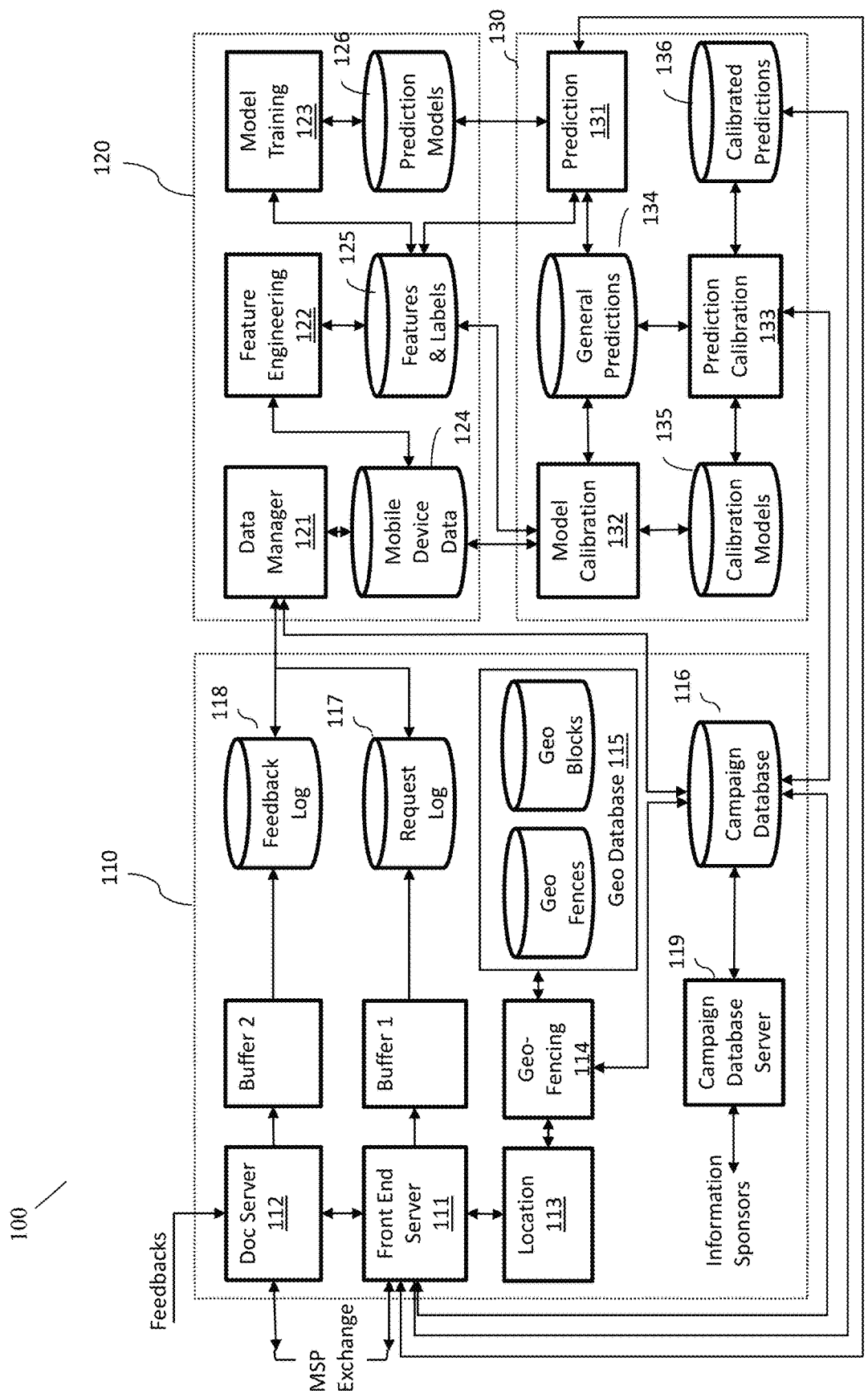
FIG. 1 is a diagrammatic representation of a system for location prediction according to embodiments.

A location prediction based information service system 100 according to some embodiments is shown in FIG. 1. The system 100 is coupled to a packet-based network and configured to serve information to mobile devices communicating with the packet-based network based on predicted probabilities of the mobile devices to have location events at certain locations within certain time frames. The system 100 comprises, among other things, a request processing unit 110, a model training unit 120, and a prediction unit 130. In certain embodiments, the system 100 is configured to perform one or more methods for calibrated location prediction, as described below.

In certain embodiments, the request processing unit 110 includes a front end server 111, a document server 112, a location module 113 and a geo-fencing module 114. The request processing unit 110 further includes or has access to a geo database 115 storing therein data associated with geo-places, and a campaign database 116 storing therein data associated with a plurality of information campaigns. The request processing unit 110 is configured to receive requests associated with mobile devices communicating with the packet-based network, to process the requests with respect to the geo places in the geo database 115 to detect location events of the mobile devices at any of the geo places, and to buffer and store the processed requests in a request log or database 117. In some embodiments, a processed request may include a detected location event corresponding to a time stamp and identifying a geo-place. The request processing unit 110 is further configured to retrieve information or documents associated with information campaigns from the campaign database 116 for delivering to mobile devices based on the processed requests associated with the mobile devices and predictions of the mobile devices to have location events at certain locations within certain time frames. The request processing unit 110 is further configured to receive feedbacks on impression, click/calls, and secondary actions made on the mobile devices in response to the information or documents, and to buffer and store the feedbacks in a feedback log or database 118. In some embodiments, the request processing unit 110 further includes a campaign database server 119 to provide information sponsors access to the campaign database 116.

In certain embodiments, the model training unit 120 includes a data manager 121 configured to generate structured mobile device data from the request log 117 and the feedback log 118 for storing in a mobile device database 124, a feature engineering module 122 configured to construct features and extract labels using the structured mobile device data and to store the features and labels in a features/labels database 125, and a model training module 113 configured to train prediction models using some of the features and labels and to store the trained models in a prediction models database 126.

In certain embodiments, the model training unit 120 is further configured to determine a relevance measure (or performance measure) for each of a plurality of geo-blocks with respect to the location group (or with respect to an information campaign) and to assign the plurality of geo-blocks into a number of geo-block brackets each corresponding to a distinct range of relevance measures (or performance measures). The model training unit 120 is further configured to construct the features related to a mobile device by generating features related to each of the number of geo-block brackets, generating features related to each of one or more most frequently visited geo-blocks for the mobile device, generating features related to each of a plurality of brands, and/or generating features related to each of the one or more retail geo-blocks, in additional to generating other features.

In certain embodiments, the geo-places include geo-blocks and geo-fences. Each of the geo-blocks correspond to a geographical region having at least one border defined by a public road or natural boundary. Each of the geo-fences correspond to a plurality of points of interest. The geo database 115 includes a geo-block database storing therein data associated with the geo-blocks and a geo-fence database storing therein data associated with the geo-fences. In certain embodiments, the location events include geo-block-based location events and geo-fence-based location events. Each geo-block-based location event is related to a geo-block in the geo-block database, and each geo-fence-based location event is related to a name or brand of a point of interest (POI) having a geo-fence in the geo-fence databases.

In certain embodiments, the prediction unit 130 includes a prediction module 131 configured to apply the prediction models to feature sets to obtain prediction results, which are stored in a general predictions database 134. The prediction results from the prediction module 131 are general prediction results and may need calibration with respect to specific information campaigns. In certain embodiments, the prediction unit 130 further includes a model calibration module 132 configured to train calibration models, which are then stored in a calibration models database 135. The prediction unit 130 further includes a prediction calibration module 133 configured to calibrate the general predictions to specific campaigns to generate calibrated predictions, which are stored in a calibrated predictions database 136 and are used by the front end server 111 to determine whether and how to present certain processed requests for fulfillment.

Several aspects of the present disclosure directly improve computer functionality. For instance, embodiments of the present disclosure achieve faster location prediction with smaller memory and processing requirements by translating raw location data into location events with respect geo-fences and geo-blocks and by filtering and aggregating the location events across time and space for machine learning processes. In further embodiments, measures of relevance are computed for the geo-blocks using mobile device signals, and the measures of relevance are used to assign geo-blocks to geo-block brackets for proper dimension reduction and data clustering, resulting in efficient use of computer resources and improved location prediction performance. In further embodiments, calibration models are machine trained and used to calibrate general prediction results to specific campaigns, reducing the need to train different location prediction models for different campaigns, and saving time and computer resources. In further embodiments, a campaign similarity model is machine trained and used to determine similar historical campaigns for a current campaign so that the calibration models of the similar historical campaigns can be used to generate a calibration model for the current campaign. This reduces the need to machine train the calibration model for the current campaign, and allows the current campaign to have a location prediction model and a calibration model ready at the start.

Figure 2:
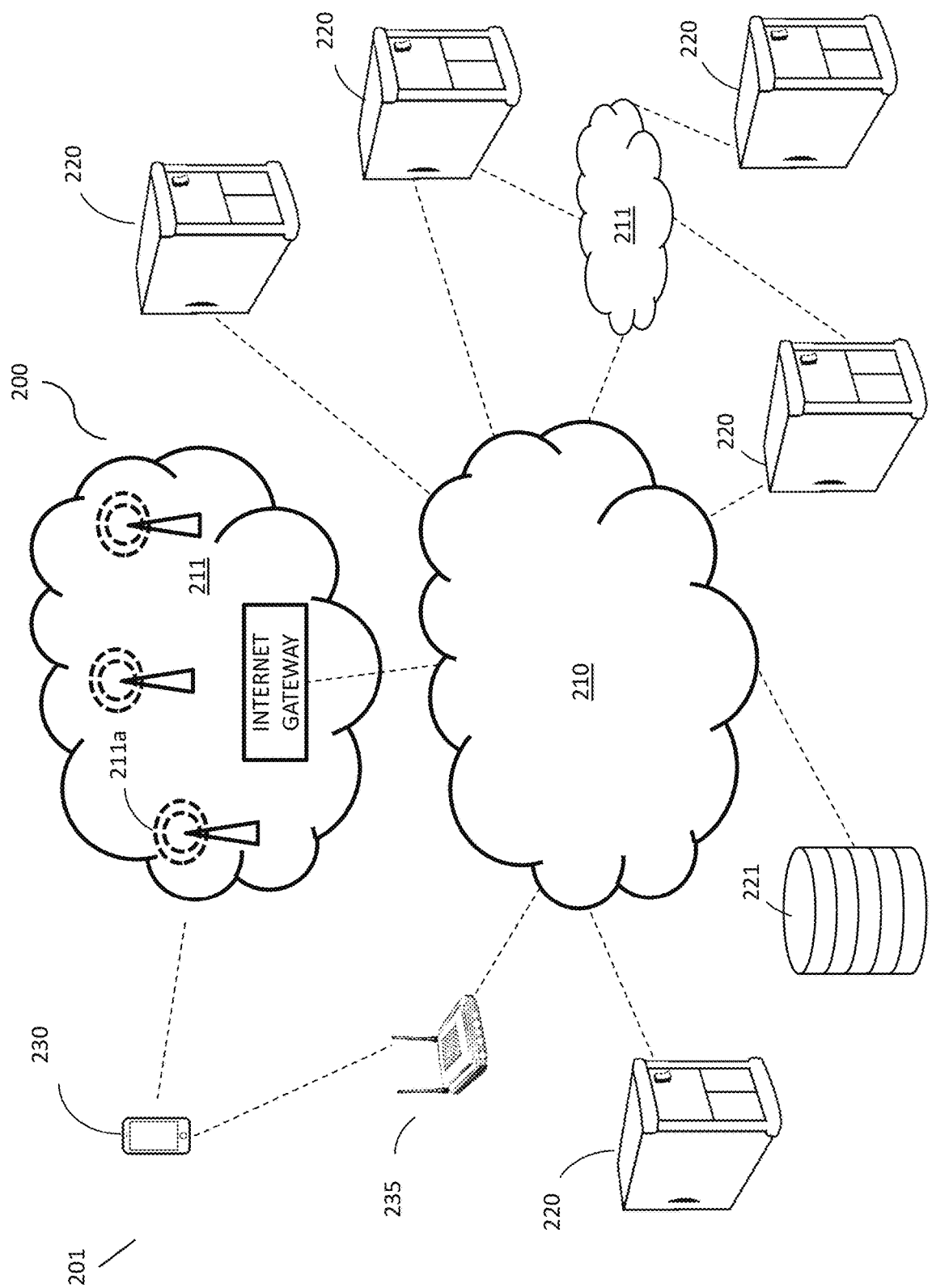
FIG. 2 is a diagrammatic representation of an environment in which the system for location prediction operates according to embodiments.

FIG. 2 is a schematic diagram illustrating an overview of an environment 201 in which some embodiments of the disclosed technology may operate. Environment 201 can include one or more computer systems 220 coupled to a packet-based network 200. The packet-based network 200 in certain embodiments includes the Internet 210 and part or all of a cellular network 211 coupled to the Internet 210 via an Internet Gateway. The computers/servers 220 can be coupled to the Internet 210 using wired Ethernet and optionally Power over Ethernet (PoE), WiFi, and/or cellular connections via the cellular network 211 including a plurality of cellular towers 211a. The network may also include one or more network attached storage (NAS) systems 221, which are computer data storage servers connected to a computer network to provide data access to a heterogeneous group of clients. As shown in FIG. 2, one or more mobile devices 230 such as smart phones or tablet computers are also coupled to the packet-based network via cellular connections to the cellular network 211. When a WiFi hotspot (such as hotspot 235) is available, a mobile device 230 may connect to the Internet 210 via a WiFi hotspot 235 using its built-in WiFi connection. Thus, the mobile devices 230 may interact with computers/servers 220 coupled to the Internet 210. A mobile device 230, or its user, or anyone or anything associated with it, or any combination thereof, is sometimes referred to herein as a mobile entity.

Figure 3:
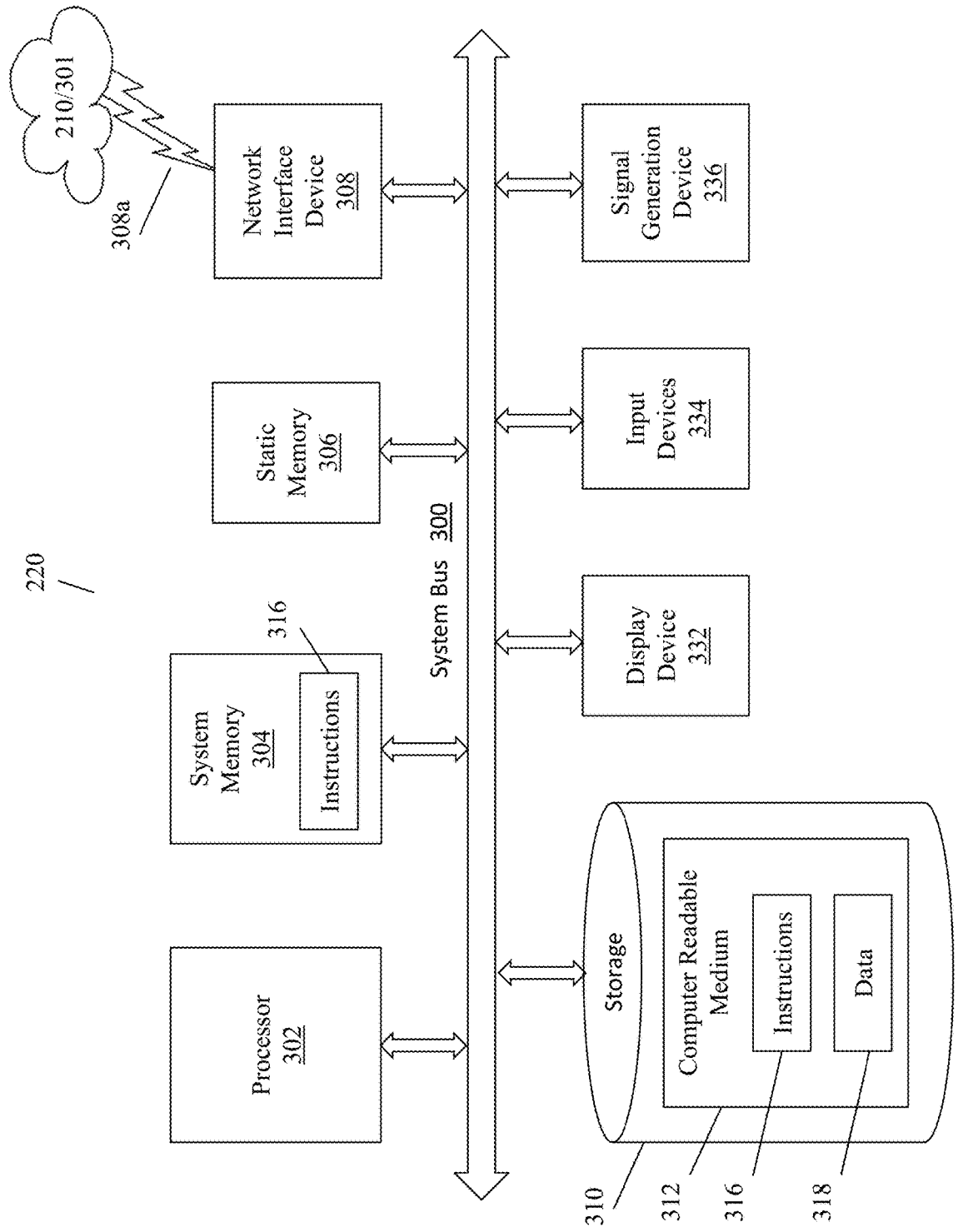
FIG. 3 is a diagrammatic representation of a computer/server that performs one or more of the methodologies and/or to provide part or all of the system for location prediction according to embodiments.

FIG. 3 illustrates a diagrammatic representation of a computer/server 220 according to certain embodiments. The computer/server 220 may operate as a standalone device or as a peer computing device in a peer-to-peer (or distributed) network computing environment. As shown in FIG. 3, the computer/server 220 includes one or more processors 302 (e.g., a central processing unit (CPU), a graphic processing unit (GPU), and/or a digital signal processor (DSP)) and a system or main memory 304 coupled to each other via a system bus 300. The computer/server 220 may further include static memory 306, a network interface device 308, a storage unit 310, one or more display devices 330, one or more input devices 334, and a signal generation device (e.g., a speaker) 336, with which the processor(s) 302 can communicate via the system bus 300.

In certain embodiments, the display device(s) 330 include one or more graphics display units (e.g., a plasma display panel (PDP), a liquid crystal display (LCD), a projector, or a cathode ray tube (CRT)). The input device(s) 334 may include an alphanumeric input device (e.g., a keyboard), a cursor control device (e.g., a mouse, trackball, joystick, motion sensor, or other pointing instrument). The storage unit 310 includes a machine-readable medium 312 on which is stored instructions 316 (e.g., software) that enable anyone or more of the systems, methodologies or functions described herein. The storage unit 310 may also store data 318 used and/or generated by the systems, methodologies or functions. The instructions 316 (e.g., software) may be loaded, completely or partially, within the main memory 304 or within the processor 302 (e.g., within a processor's cache memory) during execution thereof by the computer/server 220. Thus, the main memory 304 and the processor 302 also constitute machine-readable media.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

The location prediction system 100 according to certain embodiments can be implemented using one or more computers/servers 220 executing programs to carry out the functions and methods disclosed herein. It should be understood that the example embodiments described herein may be implemented in many different ways. In some instances, the various servers and/or modules in FIG. 1, e.g., the front end server 111, the document server 112, the location module, the campaign database server 119, the data manager 121, the feature engineering module 122, the model training module 123, the prediction module 131, the model calibration module 132, and/or the prediction calibration module 133, as described herein, may be implemented by one or more computers/servers 220, respectively or in various combinations. In some embodiments, the one or more computers/servers may be general purpose computers/servers that are transformed into the machines that execute the methods described herein, for example, by loading software instructions into one or more data processors, and then causing execution of the instructions to carry out the functions, processes, and/or methods described herein. As shown in FIG. 2, some of the computers/servers 220 are coupled to each other via a local area network (LAN) 210, which in turn is coupled to the Internet 210. Also, each computer/server 220 referred herein can include any collection of computing devices.

According to certain embodiments, as shown in FIG. 1, the system 100 includes a front-end server that receives requests from the packet-based network 200. These requests may be generated by one or more computers/servers 220 in the packet-based network as they provide mobile services to the mobile devices. In certain embodiments, the system 100 further includes a location module 113 coupled to the front-end server and configured to detect the location of a mobile device associated with each of the requests. In certain embodiment, the location module 113 is further configured to examine the location data in each received request to determine whether they include a reliable latitude/ longitude (LL) pair, and if the request does not include a reliable LL pair, the location module 113 would proceed to derive the location of the associated mobile device from other information in the location data, as described in more detail in commonly owned U.S. Pat. No. 9,886,703, issued on Feb. 6, 2018, which is incorporated herein by reference in its entirety. The system 100 further includes a geo-fencing module 114 coupled to the location module 113 and configured to determine if the detected mobile device location triggers any geo-place(s) in a geo-database and returns the triggered geo-place(s) to the front-end server. In certain embodiments, the geo-places include geo-fences and geo-blocks, and the geo database 115 is a spatial database optimized for storing and querying data that represent geographical areas or spaces and may include spatial data and meta data associated with each of the geographical areas or spaces.

In certain embodiments, the geo-fences in the geo database 115 include spatial data representing virtual perimeters of defined areas or places that mirror real-world geographical areas associated with various entities and/or brands. A defined area according to certain embodiments can be a static circle around a business location, e.g. a fence obtained using offline index databases such as InfoUSA (www.infousa.com), which provides a list of POIs and their locations, or areas specified by marketers using predefined boundaries, such as neighborhood boundaries, school attendance zones, or parcel boundaries, etc.

Figure 4:
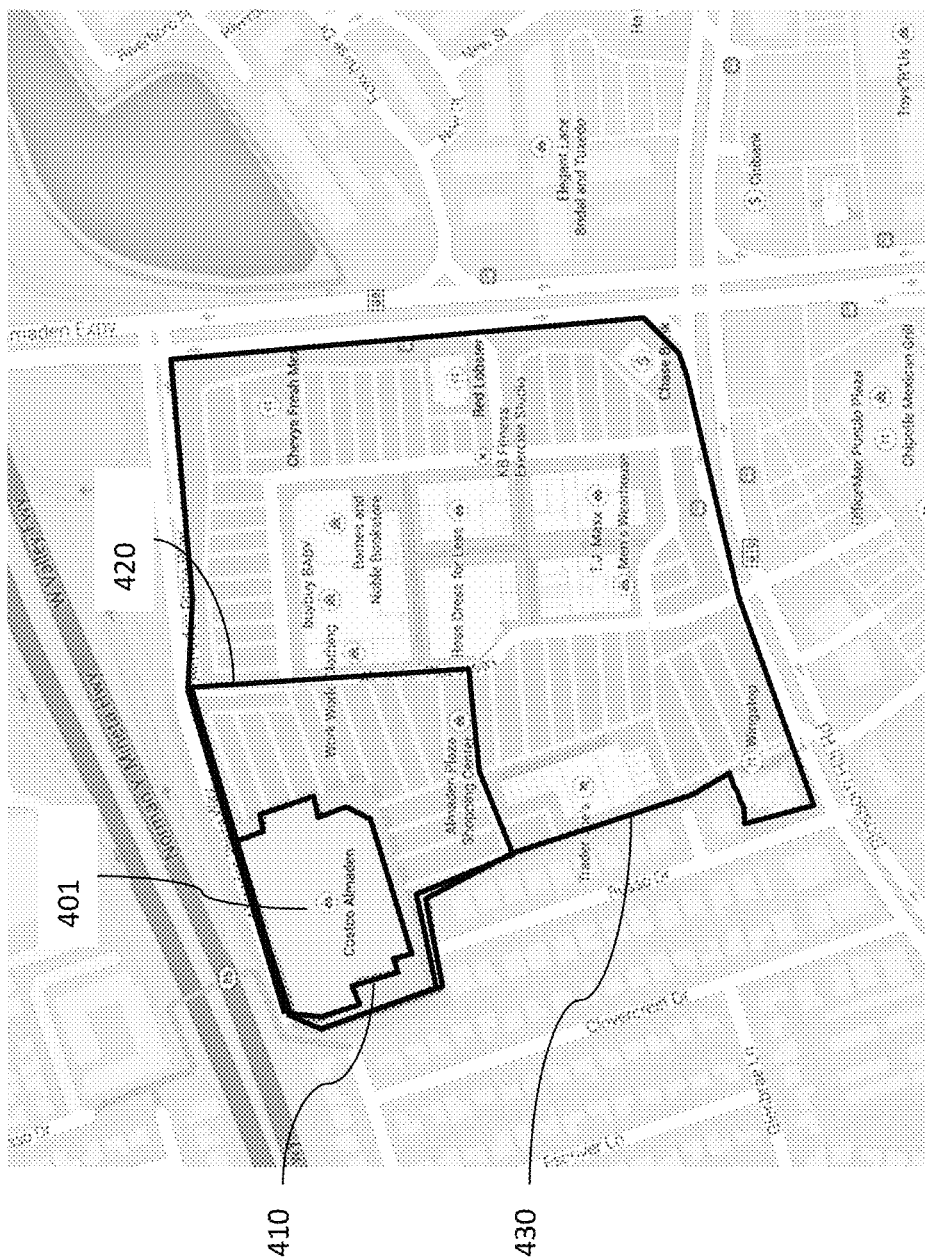
FIG. 4 is a map overlay illustrating exemplary polygonal premise geo-fences in a geographical region according to certain embodiments.

In certain embodiments, the defined areas include one or more geo-fences for each of a plurality of points of interests in consideration of the map data around the POI. For example, as shown in FIG. 4, one or more polygons are defined for the Costco Almaden store 401 to be in conformity with the real-world geographical structure and boundaries of the store and its surroundings, such as a first polygon 410 around the building of the store, a second polygon 420 around the building and its parking lot, and/or a third polygon 430 around a shopping area or business region including the store and other points of interests (POIs). In certain embodiments, these different types of geo-fences are defined for a point of interest (POI) to indicate different levels of intentions, interests, and/or behavior, etc., of a mobile user with respect to the POI, which can be used for location prediction purposes.

Thus, in certain embodiments, different types of geo-fences are associated with a business and may include, for example, (1) a business center (BC) represented by, for example, a polygon corresponding to the perimeter of the building of the business (e.g., the first polygon 410 in FIG. 4); (2) a business premise (BP) represented by a polygon corresponding to the perimeter of the business building and the neighboring parking lots (e.g., the second polygon 420 in FIG. 4); and (3) a business region (BR) or area represented by a polygon corresponding to the perimeter of a shopping center or business or commercial area in which this business is located (e.g., the third polygon 430 in FIG. 4). If a business center is triggered by a mobile device location, it can be reliably inferred that the user of the mobile device is interested in the business by actually visiting it. Triggering of a business premise provides good indication of an intent to visit the business, but not as strong as triggering the business center. If a user triggers a business region, the intent may be regarded as valid but weaker than that from triggering a business premise.

FIG. 5 illustrates examples of some of the geo-fences in the geo database 115, according to certain embodiments. As shown, the site Costco in Almaden has three different types of geo-fences associated with it—geo-fence with Fence ID 19-35175 corresponds to a business center (BC), which is defined by a polygon around the store building and represented by spatial index a1, a2, . . . , ai; geo-fence with Fence ID 19-35176 corresponds to a polygon around the site's larger premise including its parking lot and represented by spatial index b1, b2, . . . , bj; and geo-fence with Fence ID 19-35177 corresponds to polygon around the shopping center including the store and other POIs and represented by spatial index c1, c2, . . . , ck. Note that geo-fence with Fence ID 19-35177 is also associated with the names/brands of other POIs in the shopping center, as well as name of the shopping center itself. FIG. 5 also shows that the site T.J. Maxx is associated with Fence ID 19-35177 and also has two other types of fences associated with it, and the site Trader Joe's is also associated with Fence ID 19-35177 and has at least a business center place associated with it. As shown in FIG. 5, each geo-fence entry in the geo database 115 includes the spatial data associated with the respective place together with some meta data about the respective place, such as, for example, one or more names/brands associated with the place, a category of the place, a place identifier identifying a particular locale (e.g., city, district, etc.) for the place, the place type, and/or one or more doc IDs identifying one or more information documents (e.g., one or more html/JavaScript files) associated with the names/ brands or the place. In most cases, a POI's name is established as its brand, so they are used interchangeably. For ease of discussion, the brand of a POI is referred to hereafter as either the name or the brand of the POI, whichever is associated with the POI in the geo-fence database.

Figure 6:
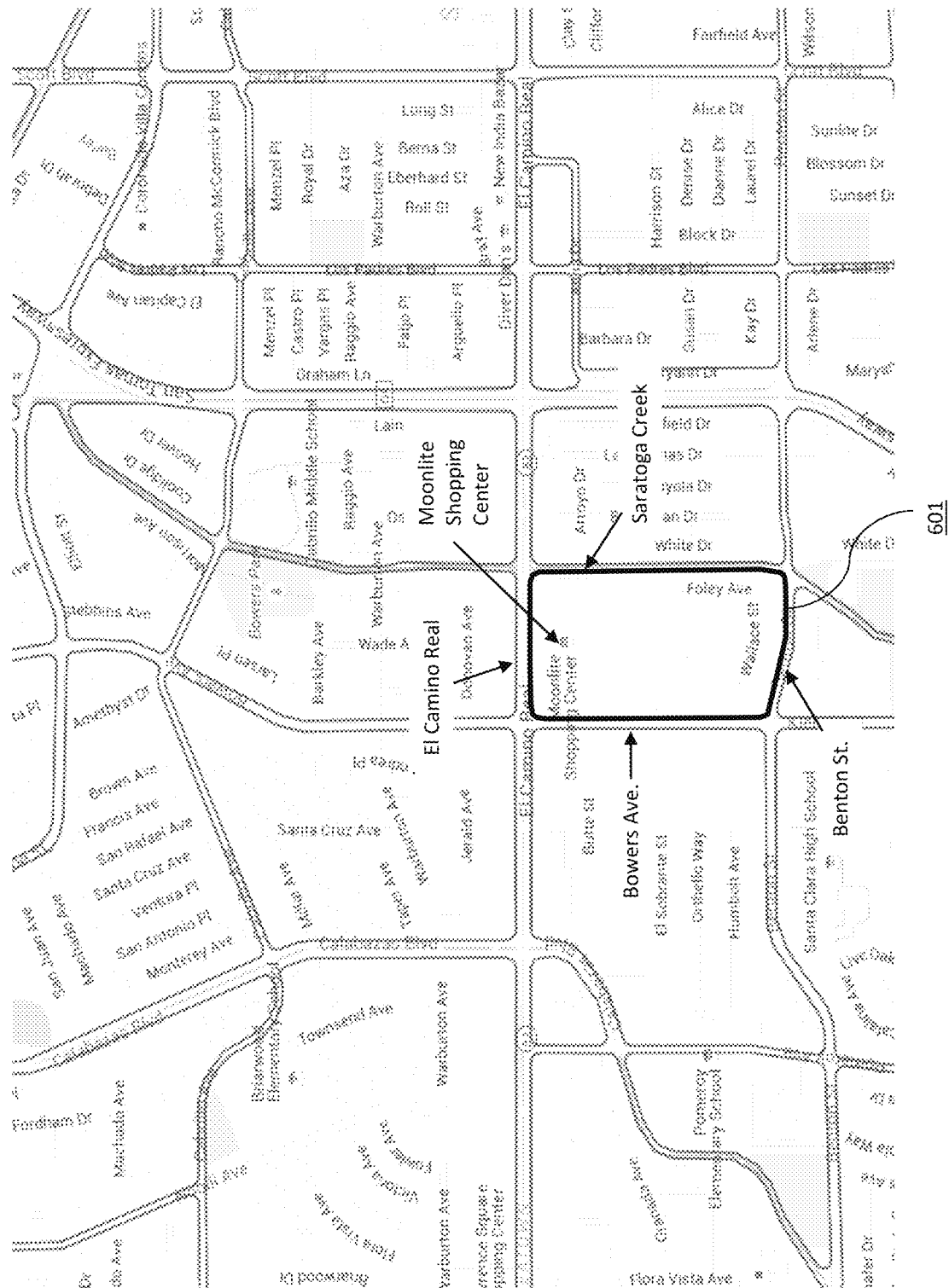
FIG. 6 is a map overlay illustrating exemplary geo-blocks in a geographical region according to certain embodiments.

In certain embodiments, the geo-blocks in the geo database 115 represent geographical regions with natural boundaries such as major roads, shorelines, mountain ranges, etc., as described in further detail below. FIG. 6 illustrates graphically exemplary geo-blocks according to certain embodiments. In this example, for an area in the city of Santa Clara, Calif., the geo-blocks are shown as outlined in boundaries overlaid on top of a map for the area, taken from, for example, Google Map, and the boundaries of the geo-blocks are mostly aligned with major roads and natural boundaries, taking into account the road width so as to exclude mobile signals from travelers on the major roads.

For example, geo-block 601 containing the Moonlite Shopping Center is shown to be bordered on three sides by major roads, El Camino Real, Bowers Ave, and Benton St., respectively, and on another side by the Saratoga Creek. Each of the geo-blocks shown in FIG. 6 can be further partitioned into more granular blocks bordered by smaller roads. Real world entities present in these geo-blocks tend to serve common functional purposes (residential, retail etc.), and these blocks form the foundation for the construction of boundaries that are highly indicative of location dependent attributes such as intention and demographics. FIG. 7 illustrates examples of some of the geo-blocks in the geo database 115, according to certain embodiments. As shown, each geo-block includes spatial data defining the boundary of the geo-block and meta data including, for example, the city/state in which the geo-block is located, the functionality of the geo-block (e.g., residential, retail, recreational, educational, etc.), one or more major POIs in the geo-block, as well as other information such as demographic of the residents or visitors of the geo-block, and inventory of requests with location data in the geo-block, etc., which can be derived from logged request data.

In certain embodiments, as shown in FIG. 8A, the front-end server receives a request 801 presented by, for example, a server run by a mobile service provider (MSP or MSP server), or an ad exchange (or exchange), via the network 200. The request 801 includes a request ID, mobile device data such as mobile device ID, maker/model, operating system, etc., mobile entity data such as user ID (UID), age, gender, income bracket, education level, etc., mobile device location data including a plurality of location components, such as latitude and longitude coordinates (LL), IP addresses (IP), postal or zip codes (ZC), and/or city-state names (CS), etc. The request may further include other information. In certain embodiments, the front-end server validates the location information by checking the validity and consistency of the location components and by weeding out any invalid location component(s). Generally, the LL is usually believed to be the most useful location component. However, when a mobile entity doesn't allow its location information to be known, mobile applications at the MSP server typically provide only coarse location data in the form of, for example, an IP address, a ZC (e.g. entered by the user at the time of registration), or CS. Thus, mobile applications at the MSP server frequently provide LLs obtained from geo-coding software, which translates ZC, CS, and other points of interests into one representative LL. In one embodiment, such representative LLs are categorized as "bad LLs". A bad LL can be, for example, a centroid of a ZC/CS, or any fixed point on a map (e.g. (0,0) or an arbitrary location).

In certain embodiments, the location module 113 is configured to weed out the bad LL's, so that location data with bad LL's are not provided to the next stage processing, by using the techniques disclosed in commonly owned U.S. patent application Ser. No. 14/716,816, entitled "System and Method for Estimating Mobile Device Locations," filed on May 19, 2015, which is incorporated herein by reference in its entirety.

The location module 113 is further configured to estimate the location of the mobile device from the request 801 and generate location data to represent an estimated mobile device location, which may be a geographical point represented by a lat/long pair or one or more probable areas or regions the mobile device is estimated to be in, as shown in processed request 802 with generated location data in FIG. 8B. The geo-fencing module 114 queries the geo database 115 with the lat/long pair or the one or more probable regions to determine whether the location data triggers one or more geo-places in the geo database 115, and returns the triggered geo-place(s) to the front-end server. In certain embodiments, the front end server 111 annotates the request 801 with the triggered geo-place(s) to generate an annotated (or processed) request 810, and outputs the annotated request 810 to buffer 1, which buffers and outputs the annotated request 810 to a request log 117. The triggered geo-place(s) may include a geo-block (if the mobile device is in a place that has been geo-blocked) and may further include one or more geo-fences if the estimated location or probable area or region is in or overlaps with the one or more geo-fences, as shown in FIG. 8C. For ease of description, the triggering of a geo-place (e.g., a geo-block or a geo-fence) is sometimes referred to herein as a location event. So, an annotated request may include one or more location events.

FIG. 9 is a table illustrating exemplary entries (or datasets) in the request log 117, according to certain embodiments. Each dataset in the request log 117 corresponds to a respective processed (or annotated) request and includes at least some of the data in the respective annotated request, such as request (or packet) ID, mobile device information such as mobile device ID, make/model, mobile user information such as UID, age, gender, education, etc., a latitude/longitude pair, data related to location events involving triggered geo-fence(s) and/or a geo-block, mobile application used at the time of the request, and the time stamp of the request, etc. In some embodiments, the annotated requests in the request log 117 are organized in the order of their respective time stamps, as shown in FIG. 9.

In certain embodiments, as shown in FIG. 8A and FIG. 9, the request 801 received by the front-end server includes other information as well as the location information, such as an application program running on the mobile device, a time stamp indicating the time of the request (e.g., day, hour, minute, etc.), one or more keywords suggesting types of information for returning to the mobile device, and/or other information associated with the mobile user, the mobile device, and/or the MSP. In some cases, the location data can trigger multiple places. For example, as shown in FIG. 4, a request that triggers the BC place 410 of Costco Almaden also triggers the BR place 430 of any of the POIs in the same business region as well as the geo-fence for the business region (e.g., a retail center or shopping mall). Thus, the request may be annotated with the BR place of one or more other POIs in the same business region, as well as the BC place of Costco Almaden. For the business region itself, the BR place may be the only geo-fenced place associated therewith, so the business region is triggered as long as the associated BR place is triggered.

Each location event involving a triggered geo-fence or a triggered geo-block is included in the annotated request together with information about the triggered geo-fence or geo-block. If a request triggers multiple places associated with a brand, only the smallest of the places (e.g., the BC or the BP place) is included as a location event. As shown in FIG. 8C, some or all of the meta data 812 of a triggerd geo-fence and some or all of the meta data 814 of the triggered geo-block can be included in the annotated request 810.

In some embodiments, the front end server 111 in system 100 is further configured to evaluate the annotated request 810 with respect any of one or more information campaigns running in the system 100, and with respect to related location prediction generated by the prediction unit 130, and to determine whether to present the request 801 for fulfillment. In some embodiments, the front end server 111 presents the request for fulfillment by placing a bid for the request 801 at the exchange or MSP, and, in the case the bid is accepted, transmitting the annotated request 810 to the document (or information) server in the system 100. In certain embodiments, the front end server 111 has access to the location predictions stored in a calibrated predictions database 136 in the prediction unit 130.

In some embodiments, the document (or information) server is configured to receive the annotated request 810 output from the front-end server and to determine which document to select based on the location data and non-location data in the annotated request. The selected document is then transmitted by the document server 112 to the MSP server (or ad exchange) via the network 200. In certain embodiments, the information server is a computer server, e.g., a web server, backed by a campaign database server 119 that information sponsors use to periodically update the content thereof and may store information documents. Each of the information documents may be stored in a campaign database 116 in the form of, for example, an html/JavaScript file or a link thereto, which, when loaded on a mobile device, displays information in the form of, for examples, a banner (static images/animation) or text. In certain embodiments, the document server 112 evaluates the annotated request 810 based on the location predictions generated by the prediction module 130.

In certain embodiments, the document selected for transmission to the MSP can be provided in the form of, for example, an html/JavaScript file, or a link to a universal resource location (URL), which can be used by the MSP or a mobile device to fetch the html/JavaScript file. The html/JavaScript file, once displayed or impressed on a mobile device, may also include one or more links that an interested user can click to access a webpage or place a call using the mobile device. The webpage enables the user of the mobile device to take secondary actions such as downloading an app or make an on-line purchase.

In certain embodiments, the html/JavaScript file is designed such that when it is displayed or impressed on a mobile device, a signal is sent by the MSP server or the mobile device automatically to the document server 112 either directly or via another server (e.g., the MSP server so that the document server 112 can keep track of whether the file has really been impressed on the mobile device. In certain embodiments, mechanism are also put in place such that when any of the one or more links are clicked, or when the mobile user download an app or make a purchase from a linked webpage, a signal is also sent from the mobile device to the document server 112 in the background either directly or indirectly so that the document server 112 can keep track of the clicks/calls or secondary actions made in response to the impression. The document server 112 provides data of such feedback events (i.e., impressions, clicks/calls, and secondary actions) to buffer 2, which buffers and outputs the data to a feedback log 118. FIG. 10 is a table illustrating exemplary entries (or datasets) in the feedback log 118 in the ordered of their respective time stamps, according to certain embodiments.

Thus, raw location data in requests are converted into brands and geo-blocks in processed requests. The logged data in the requests log and the feedback log 118 collected over a period of time (e.g., six months) form a large collection of mobile device data (e.g., millions and millions of annotated requests and impression/click/call events). The dimensions of these data are usually too large to be used directly for meaningful location prediction. In certain embodiments, the model training unit 120 is configured to reduce the dimmensions of the logged data by extracting features and labels from the location data, to train one or more prediction models using the features and labels, and to apply the prediction models to an appropriate feature space to obtain off-line predictions. As shown in FIG. 1, the model training unit 120 includes a data manager 121, a mobile device data database 124, a feature engineering module 122, a features/labels database 125, a model training module 123, and a prediction models library.

Figure 11:
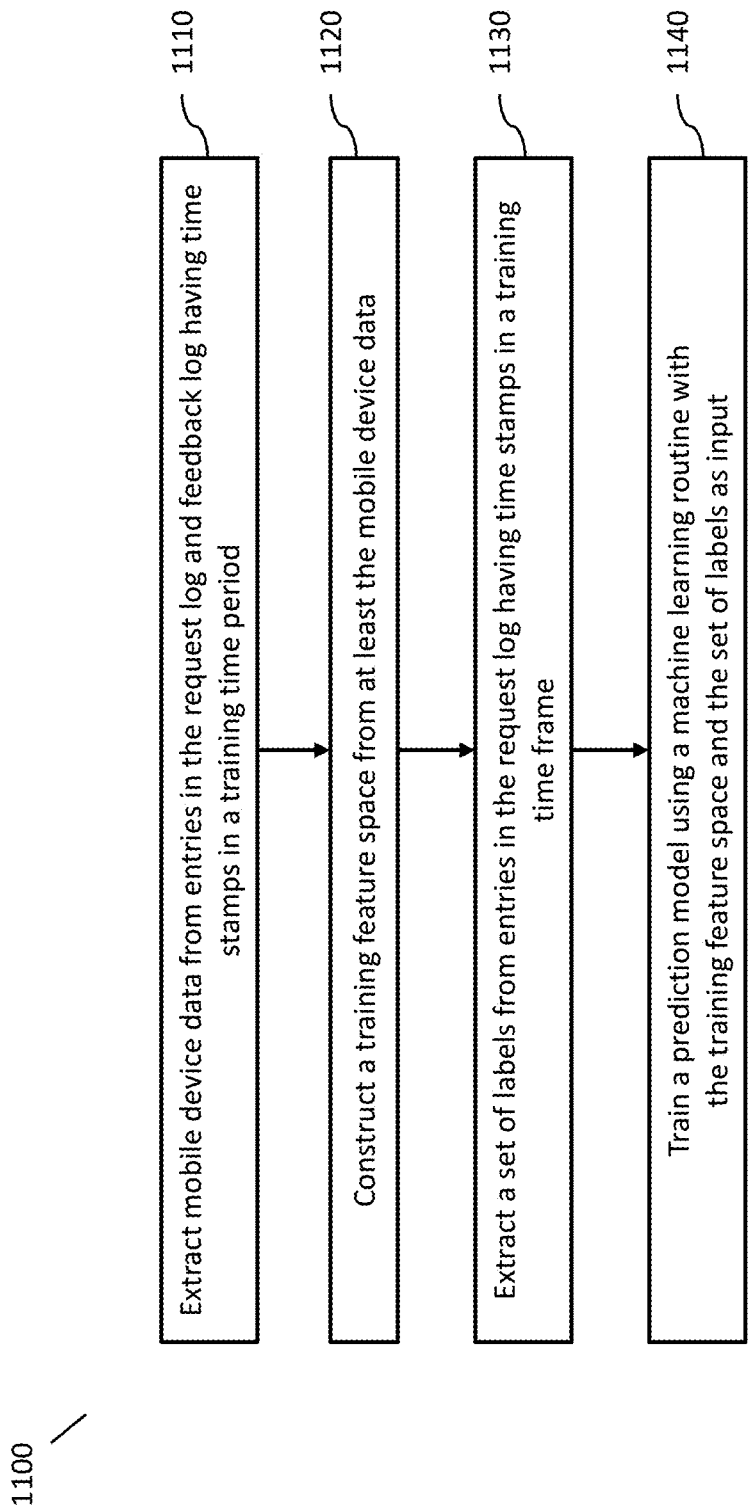
FIG. 11 is a flowchart illustrating a method of machine training a location prediction model according to come embodiments.

In certain embodiments, the model training unit 120 is configured to perform a method 1100 for training a location prediction model off line, while the front end server 111 continues to receive and process incoming requests. As illustrated in FIG. 11, method 1100 includes extracting (1110) mobile device data from datasets in the request log and feedback log having time stamps in a training time period, constructing (1120) a training feature space from at least the mobile device data, extracting (1130) a set of labels from datasets in the request log having time stamps in a training time frame, and training (1140) a prediction model using a machine learning routine with the training feature space and the set of labels as input.

Figure 13:
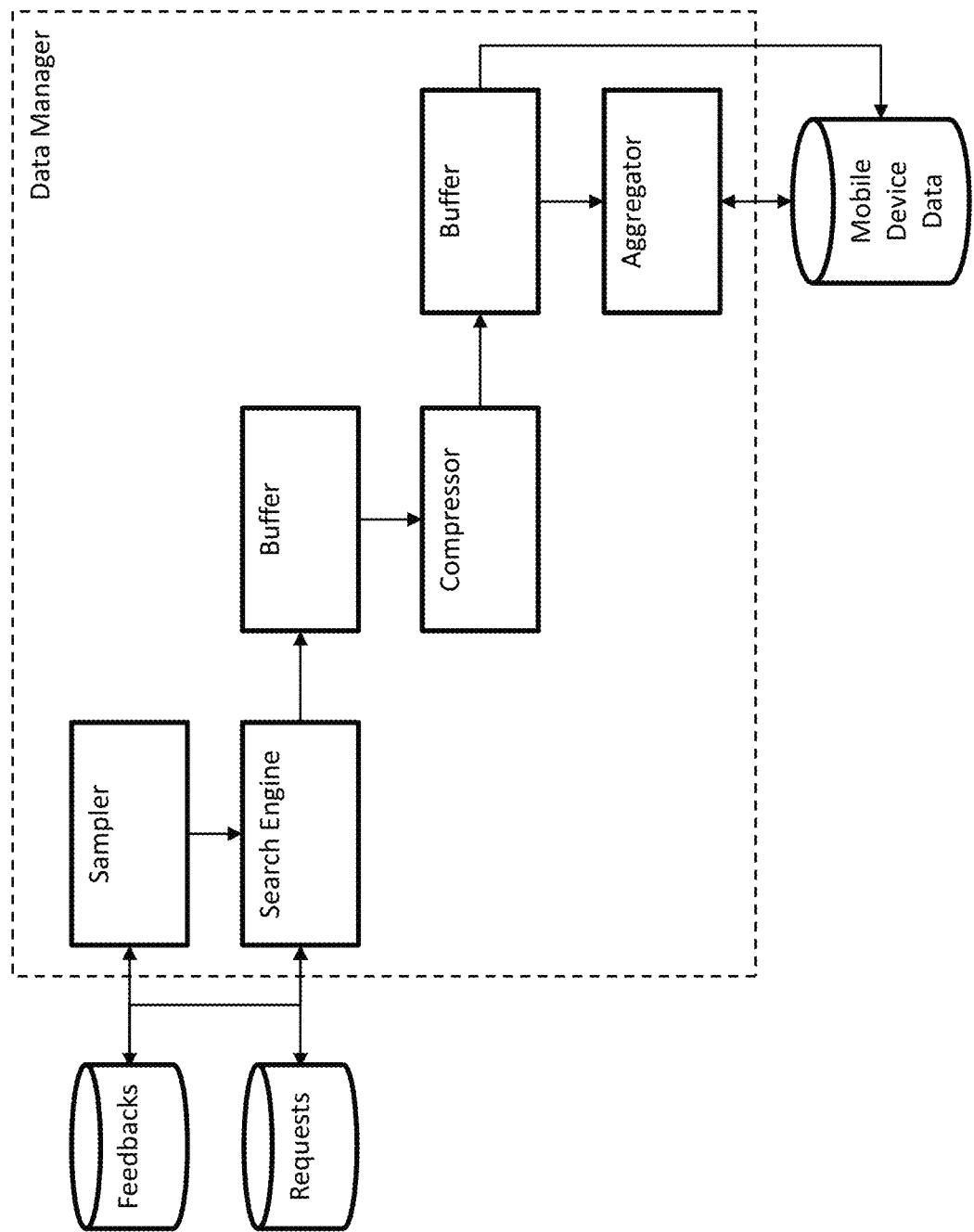
FIG. 13 is a block diagram illustrating a data manager for extracting mobile device data according to certain embodiments.

In some embodiments, the data manager 121 is configured to extract mobile device data corresponding to location events in a certain time period (e.g., training time period TTP shown in FIG. 12A) from datasets in the request log 117 having time stamps in the corresponding time period. In certain embodiments, as shown in FIG. 13, the data manager 121 includes a search engine configured to search, for each mobile device of a plurality of mobile devices, processed requests associated with the mobile device and having time stamps in a time period (e.g., TTP), and a buffer configured to buffer the output from the search engine. The data manager 121 further includes a compressor configured to compress the buffered data, such that multiple location events corresponding to consecutive time stamps triggered by the mobile device at the same place within a preset time interval (e.g. 1 hour), are reduced to a single location event. For example, if a mobile device triggered the same geo-fence and the same geo-block at different times that are within one hour of each other, resulting in multiple location events related to the geo-fence or the geo-block, the multiple events are reduced to a single event to indicate a single visit by the mobile devise to the triggered geo-fence or geo-block at one of the time stamps (e.g., the earliest time stamp) with a duration computed using the the difference between the earliest time stamp and a latest time stamp within an hour from the earliest time stamp. Another location event by the mobile device at the same place but with a time stamp beyond the preset time interval from the earliest time stamp would be considered another visit to the place by the mobile device, even though the mobile device may have stayed at the same place during the whole time.

In certain embodiments, the search engine can be configured to only search for location events with certain types of geo-fences depending on the associated brands. For example, for certain brands, only location events with triggered BC places are considered as visits to these brands/names, for certain other brands, location events with triggered BP places are sufficient to be considered as visits to these brands, and for some brands, such as retail centers or shopping malls, location events with triggered BR places are considered as visits to these brands.

The data manager 121 further includes another buffer that stores the compressed location events for the mobile device, and an aggregator configured to aggregate the location events to form a set of mobile device data corresponding to location events in the time period TTP for the mobile device. As shown in FIG. 14, the mobile device data 1410 for the mobile device with the UID 36***412 may include, for example, device and user meta data such as age, gender, education level, and other information such as maker/model, operating system, etc., aggregated location events associated with each geo-block triggered by the mobile device during the time period TTP, aggregated location events associated with each brand triggered by the mobile device during the time period TTP, aggregated feedback events associated with one or more documents impressed on the mobile device during the time period TTP, and aggregated usage data associated with mobile applications used on the mobile device during the time period TTP. In certain embodiment, a brand is triggered when a location event 812 includes the brand. Or, if the brand uses multiple types of fences, as described above, the brand is triggered when a location event 812 includes the brand and the fence type specified for the prediction model to be trained.

In certain embodiments, aggregated location events associated with each triggered geo-block (e.g., GBx) or brand (e.g., Bx) includes, for example, a number of visits to the geo-block or brand during the time period TTP, time of last visit during TTP, average length of stay per visit, etc. In certain embodiments, the number of visits to the geo-block or brand is divided among a plurality of time blocks (shown as TB1, TB2, TB3) during a day, such as morning (6:00 am to 12:00 pm), afternoon (12:00 pm to 6:00 pm) and evening (6:00 pm to 6:00 am). Likewise, usage data associated with each mobile application used on the mobile device during the time period TTP are aggregated likewise. The aggregated feedback events associated with each of one or more documents (e.g., Docx) impressed on the mobile device during the time period TTP may include, for example, a number of impressions of the document made on the mobile device during TTP, a number of click/calls the mobile device made on the impressed document, and a number of secondary actions taken with the mobile device in response to the impressed document. These numbers can also be divided among the different time blocks.

The data manager 121 is configured to perform the above searching, compression, and aggregation processes for each of the plurality of mobile devices and to store the compressed and aggregated data for the plurality of mobile devices in the mobile device database 124. In certain embodiment, as shown in FIG. 14, to reduce storage space in the mobile device database 124, the compressed and aggregated data for each mobile device (e.g., mobile device with UID 36***412) and for each time period (e.g., time period TTP) is stored as a text string 1420 in the mobile device database 124.

Since there can be thousands of different geo-blocks and brands, and different mobile devices trigger different geo-blocks and brands, the dimensions of the mobile device data in the mobile device database 124 are often too large, and the related data points are often too sparse to be used directly to train prediction models by machine learning. In certain embodiments, the model training unit 120 further includes a feature engineering module 122 configured to engineer a set of features for a location group corresponding to each of the plurality of time periods according to a feature engineering process 1500 illustrated in FIG. 15. For example, the feature engineering module 122 is configured to construct a training feature space for the location group using at least the mobile device data corresponding to the training time period TTP. In certain embodiments, the location group includes one or more locations selected for prediction. The one or more locations may correspond to, for example, one or more geo-fences associated with, for example, one or more brands or one or more categories in the geo database 115.

Figure 15:
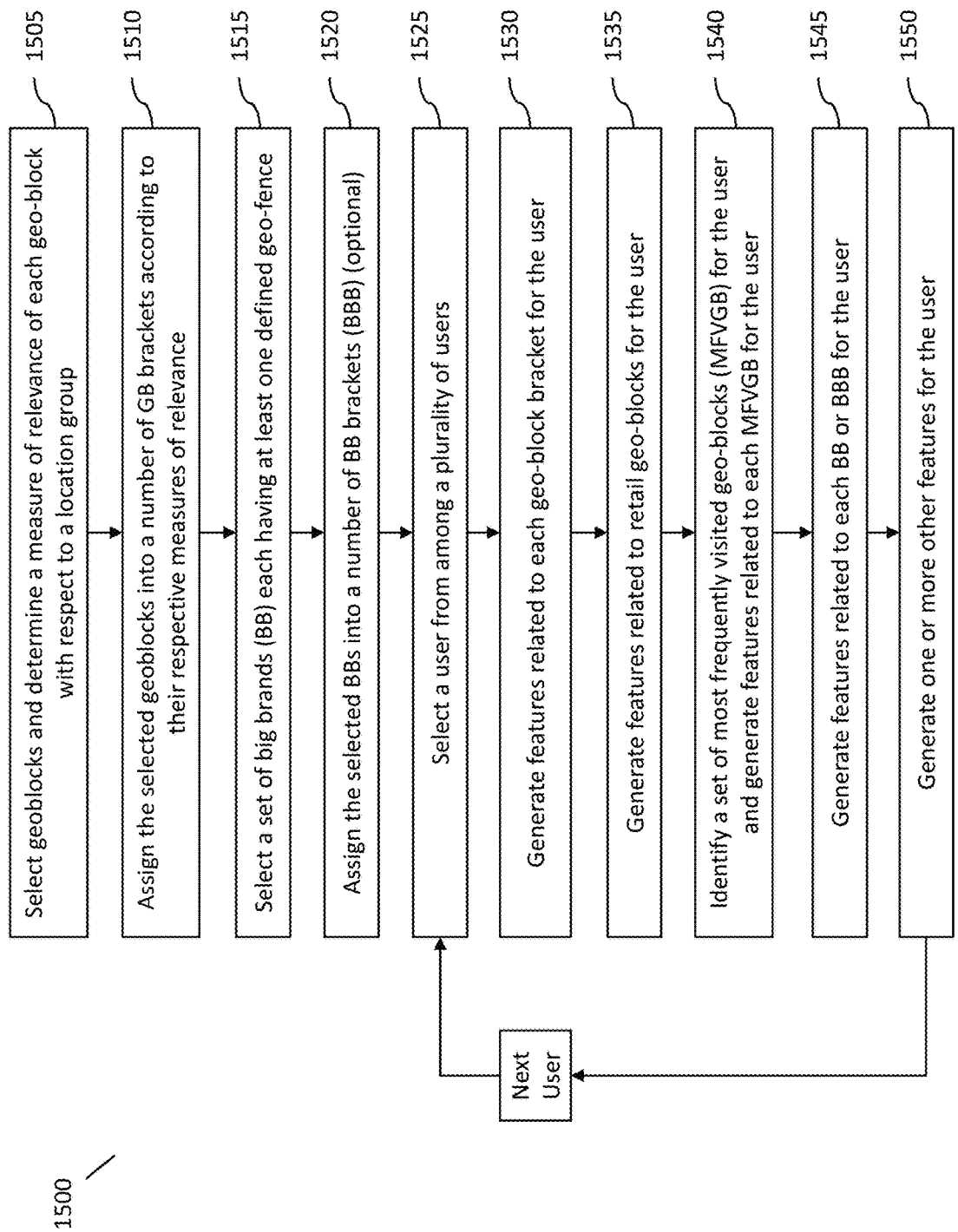
FIG. 15 is a flowchart illustrating a method for building a feature space according to certain embodiments.

As shown in FIG. 15, to construct the training feature space for a location group, the feature engineering module 122 is configured to select a set of geo-blocks and determine a relevance measure for each of the geo-blocks with respect to the location group, as recited in block 1505 of process 1500 illustrated in FIG. 15. The relevance measure (or performance measure) for a geo-block can be determined using a variety of relevance or performance metrics, as discussed in further detail below. For example, the relevance measure for the geo-block with respect to a location group can be determined using a first number of distinct mobile devices that triggered the geo-block during a pre-selected time period and a second number of the mobile devices that triggered the geo-block and also triggered the brand or category associated with any of the locations in the location group during the same time period. The relevance measure can simply be a ratio of the second number to the first number or some other combination of the two numbers and/or other factors. The first number and the second number can be determined using logged request data or extracted mobile device data. Other examples of determining the relevance measures (or performance measures) are provided in commonly-owned U.S. patent application Ser. No. 15/999,330, filed Aug. 17, 2018, now U.S. Pat. No. 10,278,014, which is incorporated herein by reference in its entirety.

In certain embodiments, the feature engineering module 122 is further configured to assign the selected geoblocks into a number of geo-block (GB) brackets according to their respective relevance measures (or performance measures), as recited in block 1510 of process 1500 illustrated in FIG. 15. In certain embodiments, the selected geo-blocks are divided into a number of geo-block brackets each corresponding to a distinct range of relevance measures (or performance measures). For example, suppose there are 2000 selected geo-blocks, which can be all of the geo-blocks in one or more targeted geographical regions, and there are 20 geo-block brackets (e.g., GBB1, GBB2, . . . , GBB20), the geo-blocks in GBB1 could include 100 geo-blocks with the highest relevance or performance measures, the geo-blocks in GBB2 could include 100 geo-blocks with the next highest relevance or performance measures, and so on. Assigning the geo-blocks into geo-block brackets largely reduces the data dimensions.

In certain embodiments, the feature engineering module 122 is further configured to select a set of brands, which may be, for example a set of relatively big brands (BB) that have sizable visits by mobile users to allow sufficient density of data, as recited in block 1505 of process 1500 illustrated in FIG. 15. Depending on how many brands are selected, the feature engineering module 122 may be further configured to assign the selected big brands into a number of big brand (BB) brackets according to their respective measures of relevance, as recited in block 1520 of process 1500 illustrated in FIG. 15. The feature engineering module 122 may be configured to determine the relevance measure for each selected brand with respect to the location group. The relevance measure for a brand can be determined using a third number of distinct mobile devices that triggered the brand during a pre-selected time period and a fourth number of the mobile devices that triggered the brand and also triggered a brand associated with any of the locations in the location group during the same time period. The relevance measure can simply be a ratio of the fourth number to the third number or some other combination of the two numbers and/or other factors. The third number and the fourth number can be determined using logged request data or extracted mobile device data.

In certain embodiments, the selected brands are divided into a number of big brand brackets (BBB) each corresponding to a distinct range of relevance measures. For example, suppose there are 1000 selected brands, and there are 20 big brand brackets (e.g., BBB1, BBB2, . . . , BBB20), the brands in BBB1 could include 50 brands with the highest performance measures, the brands in BBB2 could include 50 geo-blocks with the next highest performance measures, and so on. Selecting the big brands and optionally assigning them to the big brand brackets further reduces the data dimensions.

The feature engineering module 122 is further configured to construct a set of features for each of the plurality of mobile devices using the mobile device data associated with the mobile device and corresponding to the training time period TTP. As shown in FIG. 15, the feature engineering module 122 is configured to: select a user from among a plurality of users (block 1525 of process 1500), generate features related to each geo-block bracket for the user (block 1530 of process 1500), generate features related to retail geo-blocks for the user (block 1535 of process 1500), identify a set of most frequently visited geo-blocks (MFVGB-1, . . . , MFVGB-n) for the user and generate features related to each of the MFVGBs for the user (block 1540 of process 1500), generate features related to each BB or BB bracket (BBB) for the user (block 1545 of process 1500), and generate one or more other features for the user (block 1550 of process 1500). In certain embodiments, the set of MFVGBs may include a MFVGB from each of a plurality of geo-block functionalities, such as retail, residential, industrial, etc. Thus, the MFVGBs may include a residential MFVGB, which could be the home of the mobile user, an industrial MFVGB, which could be the workplace of the mobile user, and a retail MFVGB, which may be where the individual does most of the shopping, etc.

FIG. 16 illustrates as examples a set of features for a mobile device with UID 52256 for the time period TTP. As shown in FIG. 16**, the set of features may include device/user meta data. The features related to each GBB of the geo-block brackets ($GBB_1$, $GBB_2$, . . . , $GBB_m$) include a number of visits to any geo-block in the GBB during the time period TTP, time of last visit to any geo-block in the GBB during TTP, an average length of stay per visit to any geo-block in the GBB during TTP, etc. In certain embodiments, the number of visits to the GBB is divided among a plurality of time blocks (shown as TB1, TB2, TB3) during a day, such as morning (6:00 am to 12:00 pm), afternoon (12:00 pm to 6:00 pm) and evening (6:00 pm to 6:00 am).

Likewise, the features related to each BB or BBB of the big brands ($BB_1$, $BB_2$, . . . , $BB_m$) or big brand brackets ($BBB_1$, $BBB_2$, . . . , $BBB_m$) include a number of visits to the BB or any brand in the BBB during the time period TTP, time of last visit to the BB or any brand in the BBB during TTP, an average length of stay per visit to the BB or any brand in the BBB during TTP, etc. In certain embodiments, the number of visits to the BB or any brand in the BBB is divided among a plurality of time blocks (shown as TB1, TB2, TB3) during a day, such as morning (6:00 am to 12:00 pm), afternoon (12:00 pm to 6:00 pm) and evening (6:00 pm to 6:00 am).

A retail geo-block is a geo-block having a retail functionality, as indicated by its associated meta data. In certain embodiments, the features related to the retail geo-blocks among the selected geo-blocks include a number of weighted visits and a number of net visits. The number of net visits is the number of visits made with the mobile device to any of the retail blocks within the time period TTP, as determined using the mobile device data associated with the mobile device and corresponding to the TTP. The number of weighted visits is the weighted sum of a number of visits to each of the retail geo-blocks multiplied by a weight of the retail geo-block. The weight of the retail geo-block can be computed based on a fifth number of distinct mobile devices that triggered the retail geo-block during a pre-selected time period and a sixth number of the mobile devices that triggered the retail geo-block and also triggered a brand associated with any of the locations in the location group during the same time period. The weight can simply be a ratio of the sixth number to the fifth number or some other combination of the two numbers and/or other factors. The sixth number and the fifth number can be determined using logged request data or extracted mobile device data.

In certain embodiments, the most frequently visited geo-block (MFVGB) is the geo-block that has the most number of visits from the mobile device compared to the other selected geo-blocks. The features associated with the MFVGB can include for example, a number of visits to the MFVGB by the mobile device during the time period TTP, and the distance from the MFVGB to a nearest location among the locations in the location group. In certain embodiments, the number of visits to the MFVGB is divided among a plurality of time blocks (shown as TB1, TB2, TB3) during a day, such as morning (6:00 am to 12:00 pm), afternoon (12:00 pm to 6:00 pm) and evening (6:00 pm to 6:00 am).

In certain embodiments, the set of features for the mobile device may include other features, such as mobility features and feedback features. The mobility features may include, for example, a number of distinct brands triggered by the mobile device during the time period TTP, and a GB ratio of a number of distinct geo-blocks triggered by the mobile device to the sum of visits to all of the triggered geo-blocks during the time period TTP. The feedback features may include, for example, pre-exposure feature, which may be a number impressions of one or more documents related to the location group on the mobile device during the time period TTP, a click/call ratio, which may be the ratio of a number of times a click is made on the mobile device in response to the one or more documents to the number of impressions of the one or more documents, and a secondary action ratio, which may be the ratio of a number of times secondary actions are made on the mobile device in response to the one or more documents to the number of impressions of the one or more documents.

The sets of features for all of the plurality of mobile devices together form a feature space. The feature space corresponding to the time period TTP is referred to herein as the training feature space.

In certain embodiments, the feature generator is further configured to extract a set of labels corresponding to a time frame (e.g., TTF shown in FIG. 12A) immediately or shortly after the training time period TTP, for the plurality of mobile devices. For example, TTP can be the past 1-3 months from the day on which the training feature space is constructed, and TTF can be the next 1-2 weeks from the day on which the training feature space is constructed. Note that the beginning of TTF and the end of TTP do not have to coincide. For example, they can be up to a day or a few days apart from each other. The set of labels can be extracted from location events in the processed requests having time stamps in the time frame. In certain embodiments, the set of labels include one label for each of the plurality of mobile devices and the label is a "1" or "0" depending on whether the mobile device has triggered a geo-fence or brand associated with the location group during the time frame, as shown in FIG. 17A.

As shown in FIG. 1, the model training unit 120 further includes a model training module 123 configured to employ machine learning approaches to train a prediction model using the training feature space and the set of labels. In certain embodiment, the training module uses, for example, the Hadoop® Hive machine learning platform. The machine learning approaches used to train the off-line prediction models may include random forest, decision trees, and/or boosting trees. The machine learning approaches used in to train the on-line prediction model may include any one or more of: supervised learning using, for example, logistic regression, back propagation neural networks, etc., unsupervised learning using, for example, an Apriori algorithm, K-means clustering, semi-supervised learning, reinforcement learning using, for example, a Q-learning algorithm, temporal difference learning, and/or any other suitable learning style.

The model training module 123 may train a plurality of prediction models for different location groups associated with different information campaigns, respectively. As shown in FIG. 1, the model training unit 120 further includes a prediction models database 126 storing therein a model library including prediction models trained by the training module, each prediction model in the model library corresponds to a combination of a location group, a training time period and a training time frame.

As the front-end server continues to receive and process requests and generate additional datasets in the request log 117 corresponding to the processed requests, the data manager 121 is configured to extract mobile device data corresponding to a prediction time period (e.g., time period PTP, as shown in FIG. 12A) periodically (e.g., once per day) for each of a plurality of mobile devices, and the feature generator is further configured to construct a set of features corresponding to the prediction time period PTP for each of a plurality of mobile devices. The prediction time period has the same duration as the training time period and its start time (or end time) may be reset periodically (e.g., every time when structured mobile device data and the features corresponding to the PTP are updated), so that its end time is at or shortly before (e.g., within a day from) the time when the mobile device data for the prediction time period is recalculated.

As shown in FIG. 12A, the prediction time period has a start time $T_p$ sometime after a start time $T_t$ of the training time period and an end time at or shortly before a time when prediction is being made. In certain embodiments, both TTP and PTP have about the same duration, which can be for example, several weeks to several months (e.g., 1-3 months) to allow sufficient size of the data pool for feature engineering. The mobile devices associated with the aggregated data corresponding to different time periods do not have to be the same. For example, the mobile devices associated with the aggregated data corresponding to time period PTP may be the same plurality of mobile devices associated with the aggregated data corresponding to the time period TTP or a different set of mobile devices.

As shown in FIG. 1, the prediction unit 130 includes a prediction module 131 configured to select and apply a prediction model to a prediction feature set to obtain a corresponding prediction result. As shown in FIG. 17B, each prediction result corresponds to a mobile device, a location group and a prediction time frame, and indicates a predicted probability of the mobile device having at least one location event at any of the locations in the location group during the prediction time frame.

FIG. 17B illustrates a set of prediction results generated by the prediction module 131 after applying the prediction model corresponding to a location group to the feature sets of a plurality of mobile devices according to some embodiments. The set of prediction results include predicted probabilities of respective mobile devices to have location events at any of the location group within a prediction time frame PTF after the prediction time period PTP. The set of prediction results shown in FIG. 17B are then stored in a general predictions database 134, as they are general prediction results not tailored (or calibrated) to a specific information campaign. In some embodiments, the prediction time frame (e.g., PTF shown in FIG. 12A) is immediately or shortly after the prediction time period PTP. For example, PTP can be the past 1-3 months from the day on which the prediction feature space is constructed, and PTF can be the next 1-2 weeks from the time or the day in which the prediction is made. Thus, the beginning of PTF can be immediately or up to a day or a few days from the end of PTP.

Figure 18A:
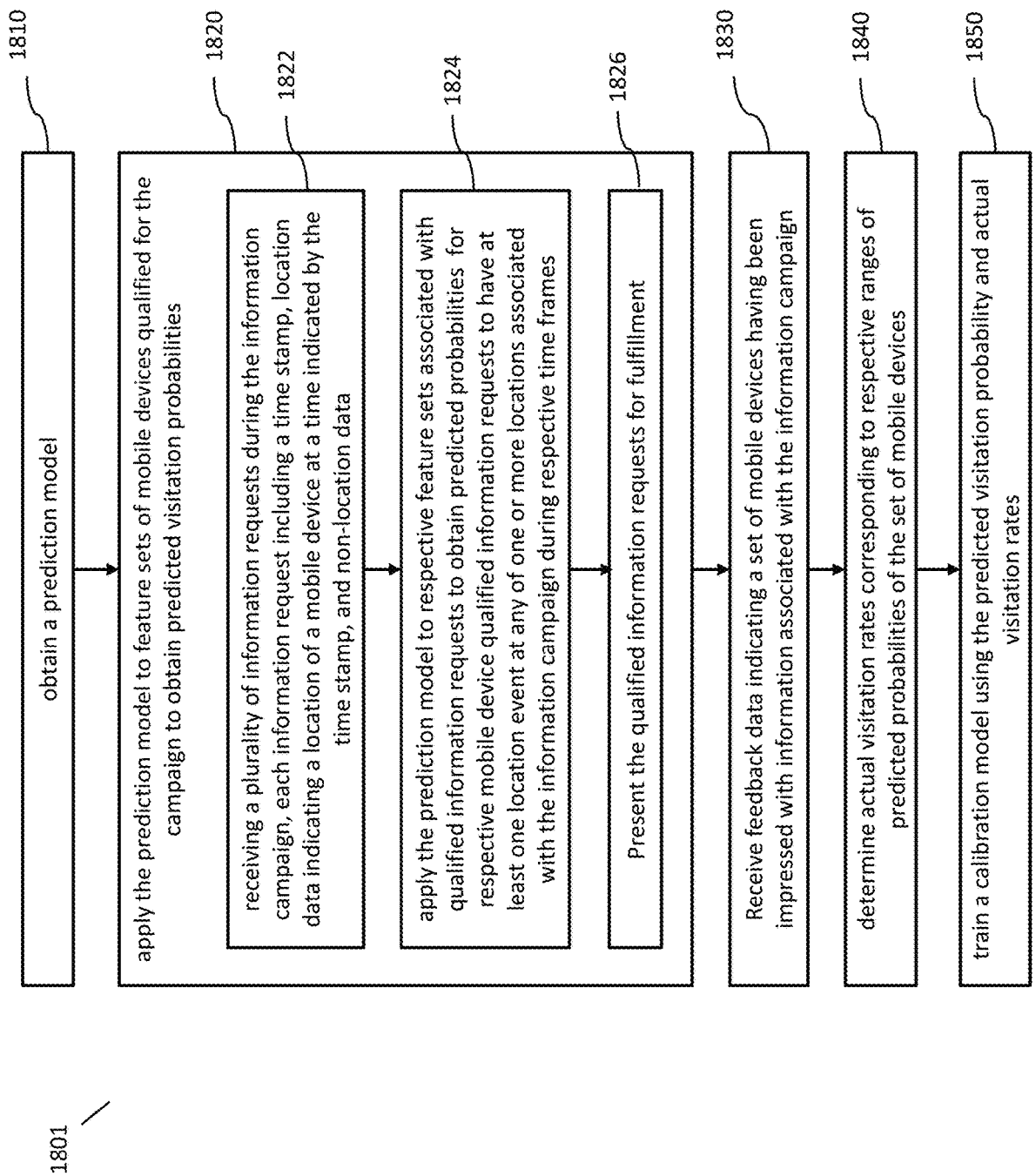
FIG. 18A is a flowchart illustrating a method of machine training a calibration model according to certain embodiments.

In some embodiments, as shown in FIG. 1, the prediction unit 130 further includes a model calibration module 132 configured to train calibration models and a prediction calibration module 133 configured to calibrate the general predictions to suit specific campaigns. FIG. 18A is a flowchart illustrating a method 1801 performed by system 100 to machine train a calibration model for an information campaign in-flight (e.g., after the information campaign has been running for a certain amount of time) according to some embodiments. As shown in FIG. 18A, method 1801 includes obtaining (1801) a general prediction model suitable for the information campaign using, for example, method 1100 and the prediction unit 120. For example, the general prediction model is trained with respect to one or more predefined locations or places associated with the information campaign and can be used to predict probabilities of mobile devices in a general audience that may or may not have been qualified for the information campaign and/or impressed with information associated with the information campaign to visit the one or more predefined locations or places.

In some embodiments, method 1801 further includes applying (1820) the prediction model to feature sets of qualified mobile devices (e.g., mobile devices associated with information requests qualified for the information campaign) to obtain predicted visitation probabilities. For example, during the information campaign, a plurality of information requests are successively received (1822) by the front end server 111 during a time period TP shortly after the campaign has started (e.g., in the first day of the campaign), as shown in FIG. 12A. Each respective request of the plurality of information requests includes a respective time stamp, respective location data indicating a location of a respective mobile device at a time indicated by the respective time stamp, and non-location data. As discussed above, the plurality of information requests are successively processed by the front end server 111 as they are received, resulting in at least some of mobile devices identified in the plurality of information requests being qualified for the information campaign. In some embodiments, a mobile device is qualified for the information campaign when an information request identifying the mobile device is qualified for the information campaign, and the information request is qualified for the information campaign when the non-location data and/or location data meet a set of criteria defined by a set of campaign parameters of the information campaign. The mobile device associated with a qualified information request is referred to here as a qualified mobile device.

In some embodiments, for each qualified request, a feature set corresponding to a mobile device associated with the qualified request can be retrieved from the features/labels database 125 shown in FIG. 1. As discussed above, the feature set may be constructed from processed requests associated with the mobile device in the request database and feedback data associated with the mobile device from the feedback database. The feature set is updated periodically (e.g., daily) so that it is constructed from such data with time stamps in a most recent prediction time period PTP that is close to the time $t_c$ of the request (e.g., 1-3 months before start of the information campaign), as shown in FIGS. 9, 10 and 12A. The feature set can be used to generally predict a probability of the mobile device to have at least one location event at any of the one or more predefined locations or places associated with the information campaign during a corresponding prediction time frame PTF (e.g., 1-2 weeks after start of the information campaign), as shown in FIGS. 9, 10, and 12A.

Method 1801 further includes applying (1824) by the prediction module 131 the general prediction model to respective feature sets corresponding to respective qualified mobile devices associated with respective qualified requests among the plurality of requests to obtain predicted probabilities for the respective qualified mobile devices to have location events at any of the one or more predefined locations or places associated with the information campaign during the prediction time frame PTF. As discussed above, in some embodiments, a respective feature set is constructed using data in respective datasets stored in the one or more databases. The respective datasets are associated with a respective qualified mobile device and including time stamps in the corresponding prediction time period (e.g., time period PTP). Method 1801 further includes presenting the qualified information requests for fulfilment. In some embodiments, the front end server 111 presents a qualified information request for fulfillment by first placing a bid for the qualified information request at the source of the information request (e.g., an ad exchange or a MSP), and in response to the bid being accepted, sending the corresponding processed request to the ad server for fulfillment. In some embodiments, the bid includes a bid price that is dependent on a predicted probability corresponding to the mobile device associated with the qualified request.

In some embodiments, method 1801 further includes receiving (1830) by the document server 112 feedback data indicating at least a portion of the qualified mobile devices having been impressed with information associated with the information campaign, responsive to at least a portion of the qualified requests among the plurality of information requests. Method 1801 further includes determining (1840) by the model calibration module 132 detected visitation rates corresponding to respective ranges of predicted probabilities of the impressed mobile devices. In some embodiments, the model calibration module 132 searches in the mobile device database 124 to determine which of the qualified mobile devices have been impressed with information associated with the information campaign and which of the impressed mobile devices have had location events (or visitation events) at any of the one or more predefined locations or places during relevant time frames. FIG. 19 is a table illustrating impression events and detected visitation events associated with certain mobile devices.

The impressed mobile devices are then divided based on their respective predicted probabilities, as determined in process 1820, into a plurality of probability brackets. For example, as shown in FIG. 20, a first portion of the impressed mobile devices having predicted probabilities larger than 0% and smaller than or equal to 1% are allocated to a first probability bracket, a second portion of the impressed mobile devices having predicted probabilities larger than 1% and smaller than or equal to 2% are allocated to a second probability bracket, . . . , and a 100th portion of the impressed mobile devices having predicted probabilities larger than 99% and smaller than or equal to 100% are allocated to a 100th probability bracket. A detected visitation rate for the mobile devices in each of the plurality of probability brackets are then determined using, for example, subsequent request data associated with the mobile devices received during corresponding time frames. In some embodiments, each of the mobile devices in a probability bracket is labeled with "0" if there is no location event associated with the mobile device at any of the one or more predefined locations or places associated with the information campaign, or labeled as "1" if there is at least one location event associated with the mobile device at any of the one or more predefined locations or places, based on subsequently processed requests with time stamps during the respective time frame. The detected visitation rate for a probability bracket can be, for example, a ratio of a number of mobile devices labeled with "1" in the probability bracket to a total number of the mobile device allocated to the probability bracket.

Figure 21:
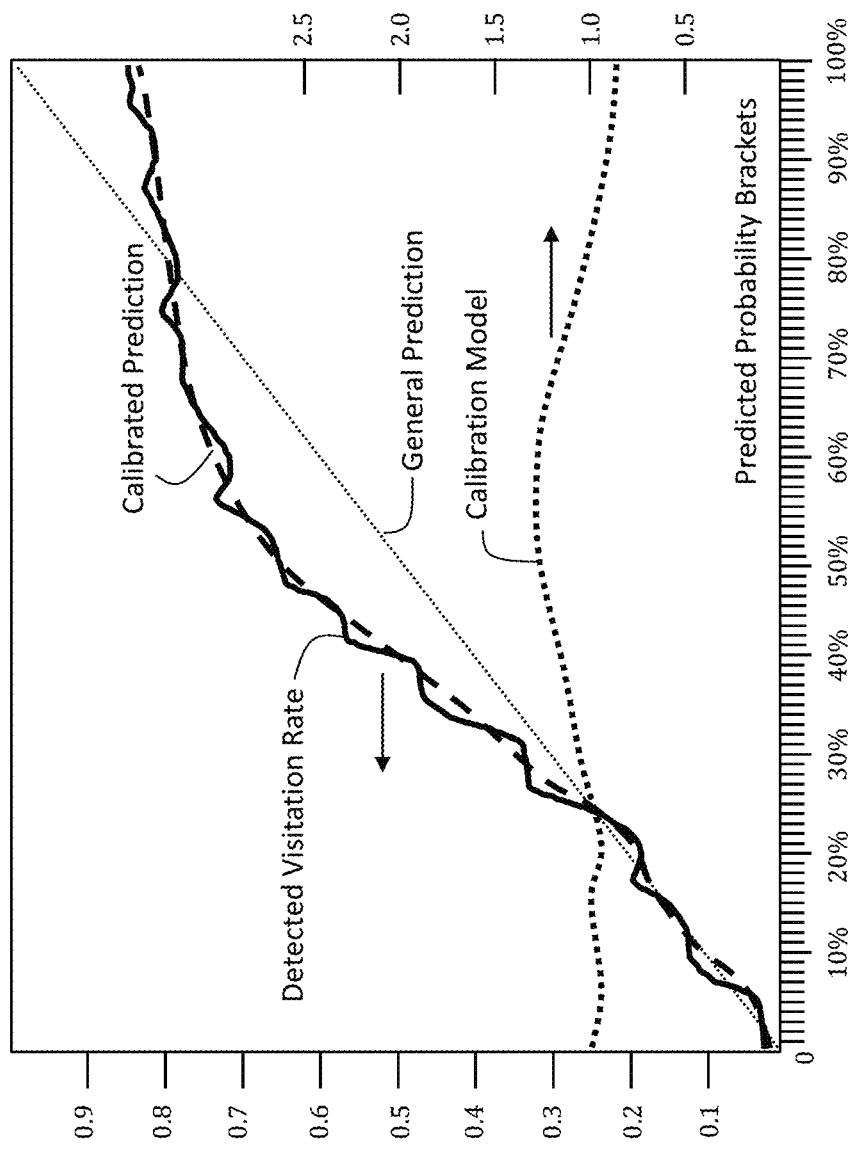
FIG. 21 is a plot illustrating calibration model training according to certain embodiments.

FIG. 21 includes a plot of detected visitation rates (thick solid line) and a plot of general predicted probabilities (thin solid line) corresponding to mobile devices in respective probability brackets. As shown, the predicted probabilities are significantly lower than the corresponding detected visitation rates for mobile devices in the $30^{th}$ to $75^{th}$ probability brackets, and significantly higher than the corresponding detected visitation rates for mobile devices in the $80^{th}$ to $100^{th}$ probability brackets. In some embodiments, the detected visitation rates and the general predicted probabilities are used to train (1850) a calibration model using, for example, isotonic regression, by the model calibration module 132. The trained calibration model (plotted in thick dotted line) is stored in the calibration models database 135. As shown in FIG. 1, the prediction unit 130 further includes a prediction calibration module 133 configured to apply the calibration model to the general predicted probabilities to generate calibrated predictions (plotted as dashed line), which are much more in line with the detected visitation rates than the general predicted probabilities.

In some embodiment, after the prediction time frame PTF, the calibration model trained using mobile device data in the prediction time period PTP and in the prediction time frame PTF is used by the prediction calibration module 133 to calibrate the general predictions generated by the prediction module 131 to obtain calibrated predictions, which are stored in the calibrated prediction data base. Compared to the general predictions, the calibrated predictions are much more accurate in predicting visitations associated with mobile devices qualified in the information campaign and/or impressed with information associated with the information campaign.

Figure 18B:
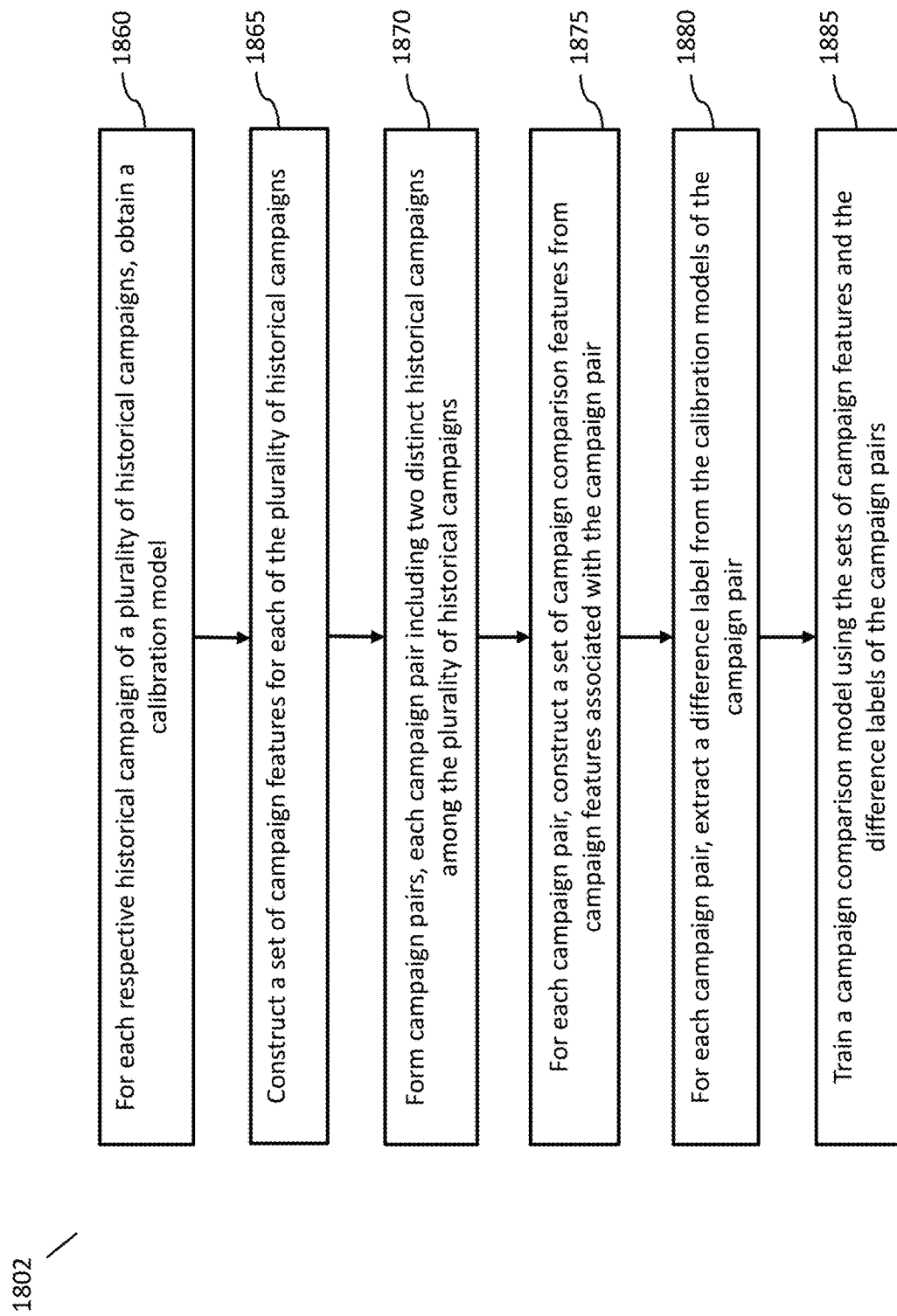
FIG. 18B is a flowchart illustrating a method of machine training a campaign comparison model according to certain embodiments.

In some embodiments, instead of waiting until after the prediction time frame PTF (e.g., 1-2 weeks) after the start of the campaign to train a calibration model, a calibration model for a current information campaign can be cold-start trained before or shortly after the start of the current information campaign. In some embodiment, a campaign comparison model is first trained, which can be used to determine which historical campaign(s) is similar to the current information campaign. FIG. 18B illustrates a method 1802 of training a campaign comparison model according to some embodiments. As shown in FIG. 18B, method 1802 includes obtaining a calibration model for each respective historical campaign of a plurality of historical campaigns. For example, the calibration model can be obtained for the respective historical campaign using method 1801 discussed above. As shown in FIG. 12B, a prediction model can be trained for the historical campaign using a feature space constructed from mobile device data in a training period $TTP_h$ and a set of labels extracted from mobile device data in a training time frame $TTF_h$ before the start of the historical campaign, and the calibration model can be trained using a feature space constructed from mobile device data in a prediction period $PTP_h$ and mobile device data in a prediction time frame $PTF_h$, as discussed above with reference to FIGS. 18A and 19-21.

FIG. 22 is a table illustrating campaign parameters of various historical campaigns. The campaign parameters include identification of a pricing model (e.g., Cost-per-Click or CPC, Cost-per-Visit or CPV, Cost-per-Mille or Cost-per-Thousand-Impression or CPM, Cost-Per-Action, Cost-Per-Acquisition (CPA), Cost-Per-Lead (CPL), and Cost-Per-Installation (CPI) etc.). The campaign parameters further include parameters related to a target audience, such as age range, gender type, education level, customer segment (e.g., loyalty or conquest), and geographical area (e.g., city, state, zip code, etc.). The campaign parameters further include parameters defining a type of mobile devices (e.g., iPhone 8+, Galaxy S9+, etc.), a type of advertisement (e.g., banner, animation, interactive, video, etc.), a mobile apps in which the ad is displayed, etc. The campaign parameters further include parameters related to one or more target locations, such as a brand, a type of geo-fence (e.g., radial, premise, etc.), a geographical area, etc.

As shown in FIG. 18B, method 1802 further includes constructing (1865) a set of campaign features for each of the plurality of historical campaigns. For example, as shown in FIG. 23, the set of campaign features for a particular historical campaign can include features related to one or more target points of interest (POIs), such as a number of visits by mobile users per a specific length of time (e.g., one week) (e.g., as indicated in mobile device data), a percentage of the one or more POIs among all the POIs in the same brand/category, the type of geo-fences used for the target POIs, and a category of the POIs (e.g., general stores, department stores, grocery stores, apparel shops, sports shops, restaurants, shopping malls, theatres, etc.). The set of campaign features further includes features related to a target audience (e.g., age range, gender type, education level, customer segment, geographical area, etc.), and features related to mobile device type(s), ad type(s), mobile app(s), etc., that are specified in the historical campaign.

Method 1802 then proceeds to form (1870) campaign pairs, each campaign pair including two distinct historical campaigns among the plurality of historical campaigns. As shown in FIG. 24, which lists various campaign pairs formed using the plurality of historical campaigns and the campaign feature sets for each campaign pair. In some embodiments, the campaign pairs include some or all of the distinct campaign pairs that can be formed with the plurality of historical campaigns. For example, for a plurality of n historical campaigns, there can be, for example, (n−1)! distinct campaign pairs. In some embodiments, n is sufficiently large to provide sufficient data to train the campaign comparison model. For example, n>100, or n>1000.

Figure 25:
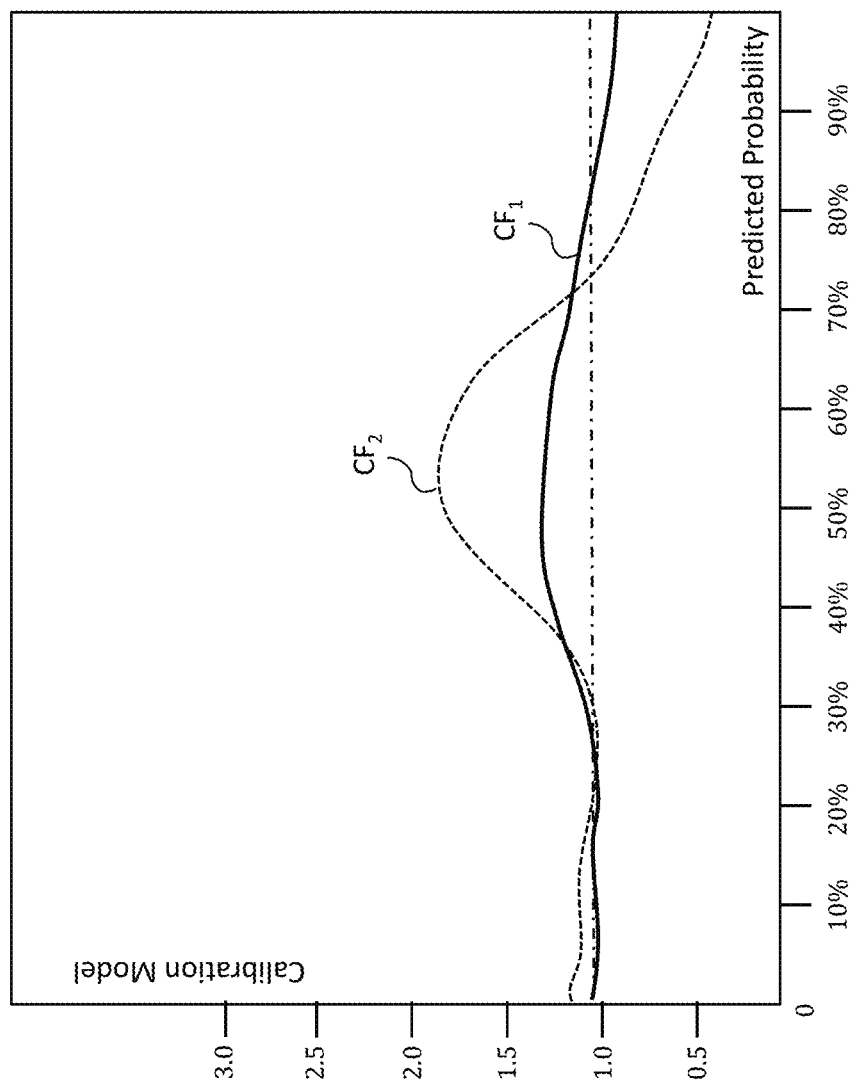
FIG. 25 is a table illustrating a feature space for training a campaign comparison model according to certain embodiments.

In some embodiments, as shown in FIG. 18B, method 1802 further comprises, for each campaign pair, constructing (1880) a set of campaign comparison features from the campaign features associated with the campaign pair, and extracting (1885) a difference value indicating a difference between the calibration models of the historical campaigns in the campaign pair. In some embodiments, as shown in FIG. 24, the set of campaign comparison features can simply be the combination of the sets of campaign features of the campaign pair. In some embodiments, as shown in FIG. 25, the difference value for a campaign pair including campaigns A and B can be measured by plotting the calibration models as curves $CF_1$ and $CF_2$ associated with campaign A and campaign B, respectively, and sum up the areas between the two curves. In some embodiments, as shown in FIG. 18B and FIG. 24, the campaign comparison features and the measured difference values of respective campaign pairs can then be used as features and labels to train (1890) a campaign comparison model by the model calibration module 132.

Figure 18C:
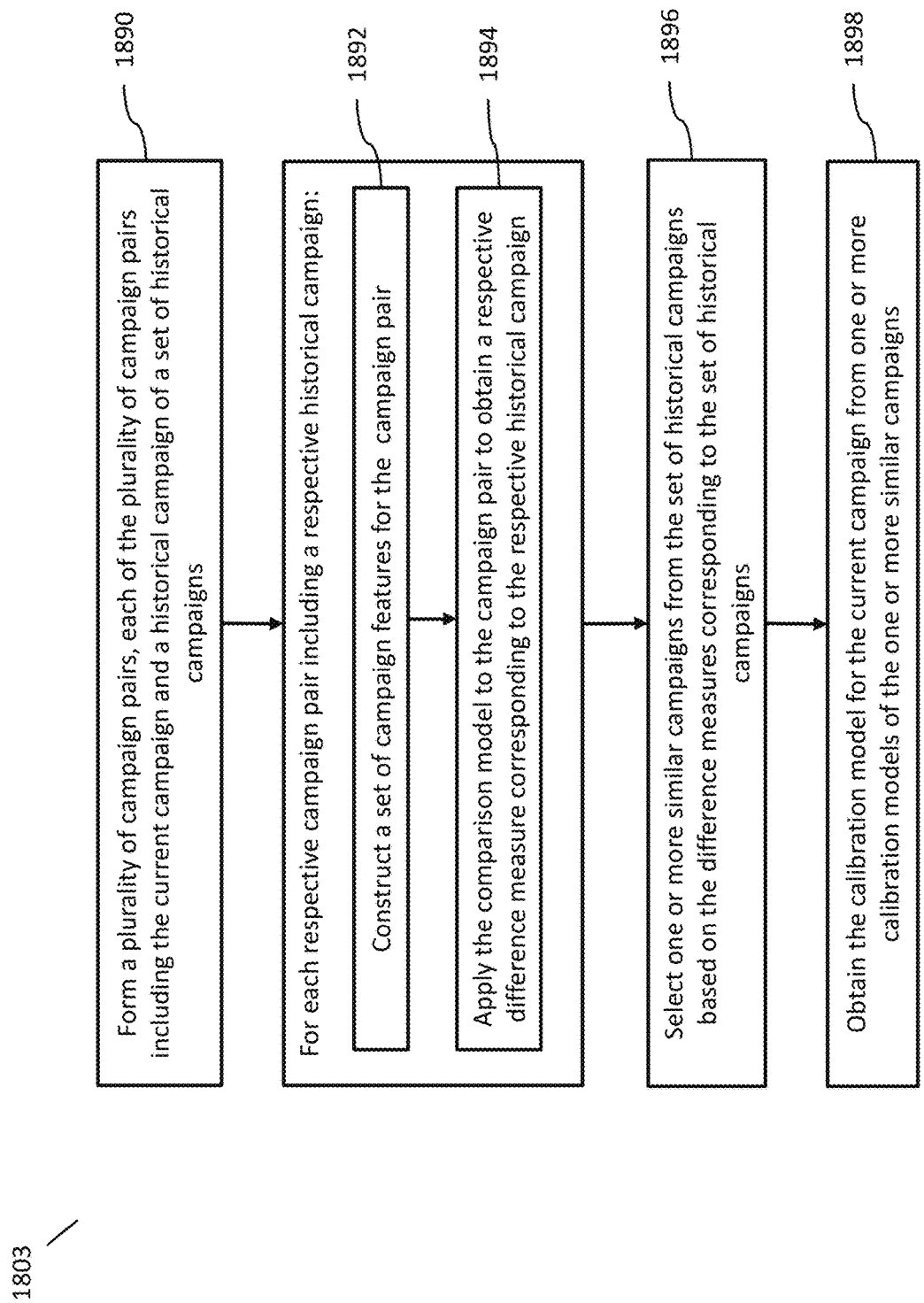
FIG. 18C is a flowchart illustrating a method of obtaining a calibration model from calibration model(s) of similar historical campaign(s) according to certain embodiments.

In some embodiments, the trained campaign comparison model is stored in the calibration models database 135 and is used to determine a difference between the current campaign and each of a set of historical campaigns. FIG. 18C is a flowchart illustrating a method 1803 of obtaining a calibration model for a current campaign using calibration model(s) of one or more similar historical campaigns according to some embodiments. As shown in FIG. 18C, method 1803 includes forming (1890) a plurality of campaign pairs, each of the plurality of campaign pairs including the current campaign and the historical campaign of a set of historical campaigns. The set of historical campaigns can be the same or a different set of historical campaigns used to train the comparison model. Method 1803 further includes, for each respective campaign pair including the current campaign and a respective historical campaign, constructing (1892) a set of campaign features for the campaign pair, and applying (1894) the campaign comparison model to the set campaign features for the respective campaign pair to obtain a respective difference measure corresponding to the respective historical campaign, the respective difference measure indicating a predicted difference between the calibration model of the current campaign the calibration model of the respective historical campaign. In some embodiments, as shown in FIG. 26, the set of campaign features can be the combination of campaign features associated with the historical campaign and campaign features associated with the current campaign. For example, the campaign features associated with the historical campaign can include features shown in FIG. 23, and so can the campaign features associated with the current campaign. FIG. 26 also illustrates the predicted difference measures corresponding to respective historical campaigns.

In some embodiments, as shown in FIG. 18C, method 1803 further includes selecting (1896) one or more similar campaigns from the set of historical campaigns based on the difference measures corresponding to the set of historical campaigns. For example, as shown in FIG. 27, the set of historical campaigns can be ranked based on their predicted different measures with respect to the current campaign. The historical campaign(s) with the lowest similarity measure(s) is then selected as the similar campaign(s). For example, as shown in FIG. 27, campaigns C25682, C65248 and C32658 each has predicted difference measures that can be rounded up to 1% and is significantly lower than the next lowest difference measure of 2.09%. So, campaigns C25682, C65248 and C32658 in this example are selected as the similar campaigns. As shown in FIG. 18C, method 1803 further includes obtaining (1898) the calibration model for the current campaign from one or more calibration models of the one or more similar campaigns. For example, if the one or more similar campaigns include just one similar campaign, the calibration model of the one similar campaign can be used as the calibration model for the current campaign. On the other hand, if the one or more similar campaigns includes multiple similar campaigns, the calibration model for the current campaign can be obtained by taking an average of the calibration models of the multiple similar campaigns.

Figure 28:
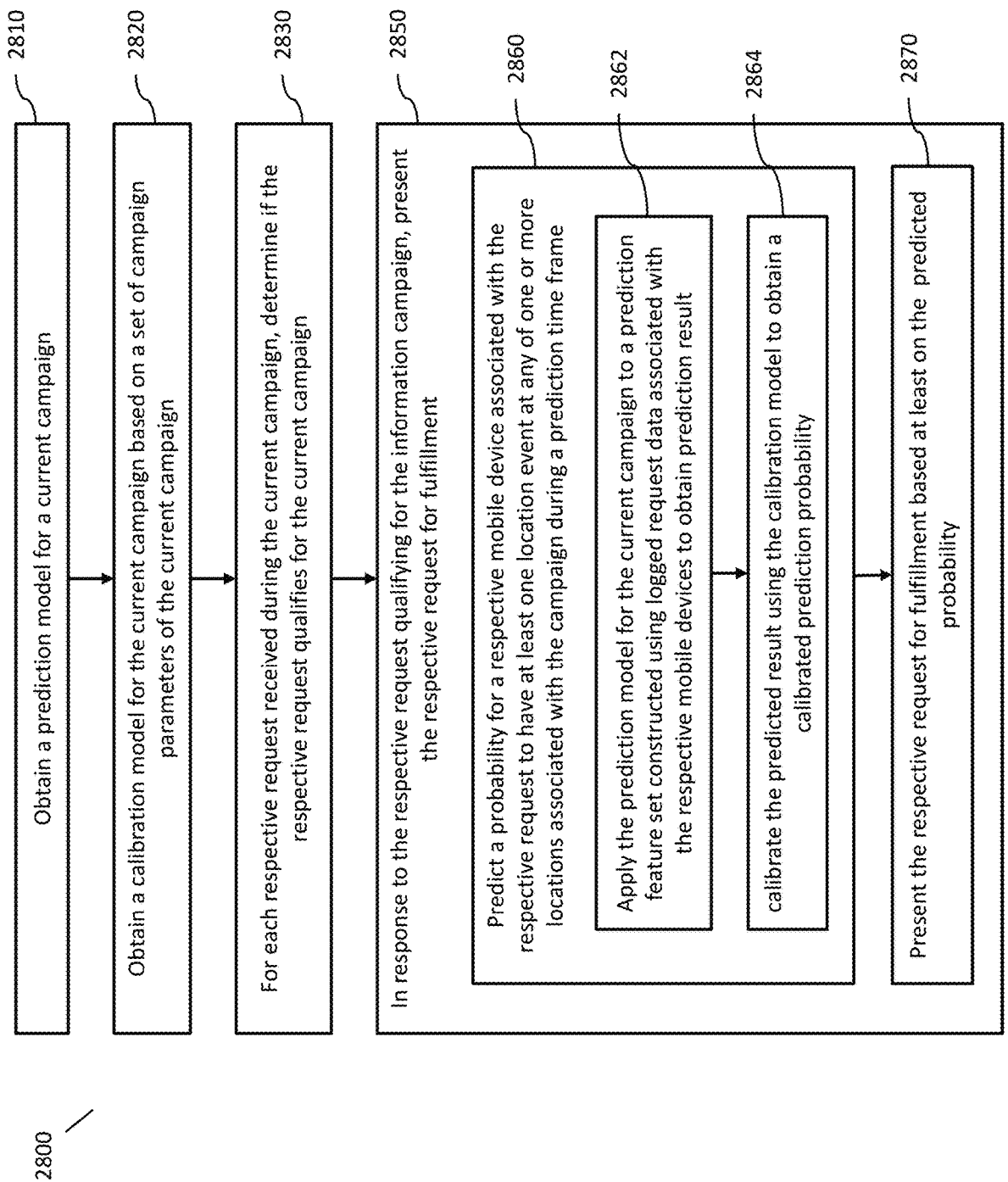
FIG. 28 is a flowchart illustrating a method for conducting the current campaign using location prediction according to certain embodiments.

FIG. 28 is a flowchart illustrating a method 2800 of conducting the current campaign according to some embodiments. As shown in FIG. 28, method 2800 includes obtaining (2810) a prediction model for the current campaign, and obtaining (2820) a calibration model for the current campaign based on a set of campaign parameters of the current campaign. In some embodiments, the prediction model can be trained with respect to one or more predefined locations or places associated with the current campaign, as described above with references to FIGS. 11-17. In some embodiments, the calibration model for the current campaign can be trained before the start of the current campaign, as described above with references to FIGS. 18B-18C and 22-27. The calibration model can also be trained during the campaign, as described above with references to FIGS. 18A and 19-21.

With the prediction model and the calibration model in store, method 2800 proceeds to process information requests during the current campaign, and to determine (2830), for each respective request received during the current campaign, if the respective request qualifies for the current campaign. In some embodiments, method 2800 includes, in response to the respective request qualifying for the information campaign, presenting (2850) the respective request for fulfillment. In some embodiments, presenting the respective request for fulfillment may include, for example, predicting a probability for a respective mobile device associated with the respective request to have at least one location event at any of the one or more locations associated with the information campaign during a specific time frame. In some embodiments, the specific time frame can be a time frame of a predefined duration (e.g., 1-2 weeks) from the time of the request. For example, as shown in FIG. 12B, for a first request with a first time stamp at time $t_1$ after the start of the current campaign at time $t_s$, the specific time frame $PTF_1$ can be 1-2 weeks from time $t_1$, or from a preset time (e.g., midnight) on the day of time $t_1$. To obtain the predicted probability for the respective mobile device in response to the respective request, the prediction model is applied to a set of features associated with the mobile device and constructed from mobile device data associated with the mobile device with time stamps in a specific time period $PTP_1$, which can be, for example, the past three months before the day of time $t_1$. Thus, the specific time frame $PTF_2$ and the specific time period $PTP_2$ can be different for another request with time stamp $t_2$ on a different day, as shown in FIG. 12B.

As shown in FIG. 28, in some embodiments, method 2800 further includes calibrating (2864) the prediction result by applying the calibration model to the prediction result to obtain a calibrated prediction probability, and presenting (2870) the respective request for fulfillment based at least on the calibrated prediction probability. As discussed above, in some embodiments, especially if the pricing model for the current campaign is based on store visitation rate, the front end server 111 presents the respective request for fulfillment by placing a bid for the respective request at the exchange or MSP, and, in the case the bid is accepted, transmitting the annotated request to the document (or information) server in the system 100. In certain embodiments, the front end server 111 has access to the location predictions stored in a calibrated predictions database 136 in the prediction unit 130. In some embodiments, especially when the pricing model for the current campaign is based on store visitations, the bid can include a bid price that is dependent on the calibrated prediction probability corresponding to the mobile device associated with the qualified request.

We claim:

1. A method, comprising:
   at one or more computer systems coupled to a packet-based network, each of the one or more computer systems including at least one processor, at least one of the one or more computer systems including or having access to one or more databases storing therein datasets associated with mobile devices, wherein each respective dataset of at least some of the datasets includes a respective time stamp and at least one respective event involving an associated mobile device at a time indicated by the respective time stamp;
   constructing a training feature space including a plurality of training feature sets corresponding, respectively, to a plurality of mobile devices, wherein a respective training feature set corresponding to a respective mobile device includes features constructed using datasets associated with the respective mobile device and having time stamps in a training time period;
   obtaining a plurality of labels corresponding, respectively, to the plurality of mobile devices, wherein a specific label corresponding to a specific mobile device indicates whether the specific mobile device has at least one location event at any of one or more predefined places of a location group during a training time frame;
   machine training a location prediction model corresponding to the location group using the training feature space and the plurality of labels;
   obtaining a prediction calibration model corresponding to an information campaign;
   receiving a first information request during the information campaign, the first information request identifying a first mobile device and including a first time stamp and a first location of the first mobile device at a first time indicated by the first time stamp;
   determining if the first information request qualifies for the information campaign based on data associated with the first information request and a set of campaign parameters of the information campaign, the set of campaign parameters including parameters specifying one or more target places of interest (POIs);

in response to the first information request qualifying for the information campaign:
predicting a first probability of the first mobile device to have at least one location event at any of the one or more target POIs during a first prediction time frame after the first time, including applying the location prediction model to a first feature set corresponding to the first mobile device to obtain a first prediction result and applying the prediction calibration model to the first prediction result to obtain the first probability, the first feature set being constructed using datasets associated with the first mobile device and having time stamps in a first prediction time period before the first prediction time frame; and presenting the first information request for fulfillment based at least in part on the first probability.

2. The method of claim 1, wherein obtaining a prediction calibration model corresponding to the information campaign includes, after the information campaign has been running for a predetermined amount of time:
selecting a group of mobile devices, wherein each of the group of mobile devices has been impressed with information associated with the information campaign;
obtaining predicted probabilities of resepctive ones of the group of mobile devices to have location events at the one or more target POIs during a calibration time frame;
allocating the group of mobile devices to a plurality of probability brackets corresponding, respectively, to a plurality of ranges of predicted probabilities, wherein mobile devices allocated to a specific probability bracket have predicted probabilities in a specific range;
for each respective probability bracket, determining a respective visitation rate corresponding to the respective probability bracket, the respective visitation rate corresponding to a proportion of mobile devices allocated to the respective probability bracket having had at least one location event at any of the one or more target POIs during the calibration time frame; and
machine training a calibration model for the information campaign based at least in part on visitation rates corresponding, respectively, to the plurality of probability brackets.

3. The method of claim 2, wherein obtaining predicted probabilities of the group of mobile devices includes:
constructing a prediction feature space including a plurality of prediction feature sets corresponding, respectively, to the group of mobile devices, wherein a specific prediction feature set corresponding to a specific mobile device includes features constructed using datasets associated with the specific mobile device and having time stamps in a calibration time period before the calibration time frame; and
applying the location prediction model to the prediction feature space to obtain the predicted probabilities of the group of mobile devices.

4. The method of claim 2, wherein the respective visitation rate is determined based at least in part on information requests associated with the mobile devices allocated to the respective probability bracket and having time stamps in the calibration time frame.

5. The method of claim 1, wherein obtaining a prediction calibration model corresponding to the information campaign includes, before or shortly after a start of the information campaign:
selecting a first plurality of historical campaigns, each of the first plurality of historical campaigns having a corresponding historical calibration model;
for each respective historical campaign of the first plurality of historical campaigns, estimating a respective difference measure corresponding to the respective historical campaign, the respective difference measure indicating an estimated difference between the information campaign and the respective historical campaign;
selecting one or more similar campaigns from the first plurality of historical campaigns, wherein one or more estimated different measures corresponding to the one or more similar campaigns are each less than any of the difference measures corresponding to other historical campaigns of the first plurality of historical campaigns; and
obtaining the prediction calibration model for the information campaign using one or more historical calibration models corresponding to respective ones of the one or more similar campaigns.

6. The method of claim 5, wherein the one or more similar campaigns include multiple similar campaigns, and wherein the prediction calibration model is obtained as an average of multiple historical calibration models corresponding to the multiple similar campaigns.

7. The method of claim 5, wherein estimating the respective difference measure comprises:
applying a campaign comparison model to a set of campaign features constructed using campaign parameters of the information campaign and the respective historical campaign to obtain the respective estimated difference measure corresponding to the respective historical campaign.

8. The method of claim 7, further comprising:
obtaining a calibration model for each of a second plurality of historical campaigns;
forming a plurality of distinct campaign pairs from the second plurality of historical campaigns, each campaign pair of the plurality of campaign pairs including two distinct historical campaigns;
constructing a campaign feature space, including, for each specific campaign pair of the plurality of campaign pairs constructing a set of historical campaign features from campaign parameters associated with the specific campaign pair;
determining campaign difference labels corresponding, respectively, to the plurality of distinct campaign pairs using calibration models of the plurality of distinct campaign pairs; and
machine training the campaign comparison model using the campaign feature space and campaign difference labels.

9. The method of claim 8, wherein obtaining a calibration model for each of the second plurality of historical campaigns comprises, for a first historical campaign:
selecting a set of mobile devices, each of the set of mobile devices having been impressed with information associated with the first historical campaign;
obtaining predicted probabilities of the set of mobile devices to be any of one or more POIs associated with the first historical campaign during a historical time frame;

allocating the set of mobile devices to a plurality of prediction brackets corresponding, respectively, to a plurality of ranges of prediction probabilities, such that mobile devices allocated to a specific prediction bracket have prediction probabilities in a specific range;

after the historical time frame, for each respective prediction bracket, determining a respective historical visitation rate corresponding to the respective prediction bracket, the respective historical visitation rate corresponding to a proportion of mobile devices allocated to the respective prediction bracket having had at least one location event at any of the one or more POIs associated with the first historical campaign during the historical time frame; and machine training a calibration model for the first historical campaign based at least in part on the historical visitation rates corresponding, respectively, to the plurality of prediction brackets.

10. The method of claim 1, wherein the datasets associated with mobile devices includes datasets corresponding, respectively, to information requests related to the mobile devices, and datasets corresponding, respectively, to actions on the mobile devices, the actions including some of all of impressions, clicks, calls and secondary actions.

11. The method of claim 1, wherein:
the respective training feature set corresponding to the respective mobile device includes location features based on location events triggered by information requests associated with the respective mobile device during the training time period; and
the first feature set corresponding to the first mobile device includes location features based on location events triggered by information requests associated with the first mobile device during the first prediction time period.

12. The method of claim 11, wherein:
the location events triggered by information requests associated with the respective mobile device during the training time period include location events based on predefined geographical regions and location events based on predefined geo-fences associated with points of interest; and
the location events triggered by information requests associated with the first mobile device during the first prediction time period include location events based on predefined geographical regions and location events based on predefined geo-fences associated with points of interest.

13. The method of claim 12, wherein each of the predefined geographical regions borders at least one public road or natural boundary.

14. The method of claim 1, wherein presenting the first information request for fulfillment based at least in part on the first predicted probability comprises placing a bid for the first information request with a bid price based at least in part on the first predicted probability.

15. A system, comprising:
one or more databases storing therein datasets associated with mobile devices, wherein each respective dataset of at least some of the datasets includes a respective time stamp and at least one respective event involving an associated mobile device at a time indicated by the respective time stamp;
one or more processors; and
one or more memories into which one or more computer programs can be loaded for execution by the one or more processors to function as one or more modules, units and servers including:
a feature engineering module configured to construct a training feature space including a plurality of training feature sets corresponding, respectively, to a plurality of mobile devices, and to extract a plurality of labels corresponding, respectively, to the plurality of mobile devices, wherein:
a respective training feature set corresponding to a respective mobile device includes features constructed using datasets associated with the respective mobile device and having time stamps in a training time period; and
a specific label corresponding to a specific mobile device indicates whether the specific mobile device has had at least one location event at any of one or more predefined places of a location group during a training time frame;
a machine learning module configured to train a location prediction model corresponding to the location group using the feature space and the plurality of labels;
a front-end server configured to receive and process information requests and to store processed information requests as datasets in the one or more databases; and
a prediction unit configured to predict probabilities of mobile devices to have location events at any of one or more target points of interest (POIs) during certain time frames of an information campaign;
wherein the front-end server is further configured to receive a first information request associated with a first mobile device, and to determine if the first information request qualifies for the information campaign based on request data associated with the first information request and a set of campaign parameters of the information campaign, the set of campaign parameters including parameters specifying one or more target places of interest (POIs);
wherein the prediction unit includes a prediction module configured to apply the prediction model to a first feature set corresponding to the first mobile device to obtain a first prediction result, the first feature set being constructed using datasets identifying the first mobile device and having time stamps in a first prediction time period;
wherein the prediction unit further includes a calibration module configured to obtain a calibration model corresponding to the information campaign, and a calibrated prediction module configured to apply the calibration model to the first prediction result to obtain a first predicted probability of the first mobile device to have at least one location event at any of one or more target points of interest (POIs) during a first prediction time frame after the first prediction time period; and
wherein the front-end server is further configured to, in response to the first information request qualifying for the information campaign, present the first information request for fulfillment based at least in part on the first predicted probability.

16. The system of claim 15, wherein the calibration model is obtained after the information campaign has been running for a predetermined period of time, and wherein the calibration module is configured to:
select a group of mobile devices, wherein each of the group of mobile devices has been impressed with information associated with the information campaign during the predetermined period of time;

obtain predicted probabilities of respective ones of the group of mobile devices to have location events at the one or more target POIs during a calibration time frame;

allocate the group of mobile devices to a plurality of probability brackets corresponding, respectively, to a plurality of ranges of predicted probabilities, wherein mobile devices allocated to a specific probability bracket have predicted probabilities in a specific range;

for each respective probability bracket, determine a respective visitation rate corresponding to the respective probability bracket, the respective visitation rate corresponding to a proportion of mobile devices allocated to the respective probability bracket having had at least one location event at any of the one or more target POIs during the calibration time frame;

machine train a calibration model for the information campaign based at least in part on visitation rates corresponding, respectively, to the plurality of probability brackets.

17. The system of claim 15, wherein the calibration model is obtained before or shortly after a start of the information campaign, and wherein the calibration module is further configured to:

select a first plurality of historical campaigns, each of the first plurality of historical campaigns having a corresponding historical calibration model;

for each respective historical campaign of the first plurality of historical campaigns, estimate a respective difference measure corresponding to the respective historical campaign, the respective difference measure indicating an estimated difference between the information campaign and the respective historical campaign;

select one or more similar campaigns from the first plurality of historical campaigns, wherein one or more estimated different measures corresponding to the one or more similar campaigns are less than any of the difference measures corresponding to other historical campaigns of the first plurality of historical campaigns; and obtain the prediction calibration model for the information campaign using one or more historical calibration models corresponding to respective ones of the one or more similar campaigns.

18. The system of claim 17, wherein the calibration module is further configured to:

obtain a calibration model for each of a second plurality of historical campaigns;

form a plurality of distinct campaign pairs from the second plurality of historical campaigns, each campaign pair of the plurality of campaign pairs including two distinct historical campaigns;

construct a campaign feature space, including, for each specific campaign pair of the plurality of campaign pairs constructing a set of historical campaign features from campaign parameters associated with the specific campaign pair;

determine campaign difference labels corresponding, respectively, to the plurality of distinct campaign pairs using calibration models of the plurality of distinct campaign pairs; and machine train the campaign comparison model using the campaign feature space and campaign difference labels.

* * * * *